United States Patent [19]
Fujiu et al.

[11] Patent Number: 5,689,063
[45] Date of Patent: Nov. 18, 1997

[54] ATOMIC FORCE MICROSCOPE USING CANTILEVER ATTACHED TO OPTICAL MICROSCOPE

[75] Inventors: Takamitsu Fujiu, Zama; Shunji Watanabe, Setagaya-ku; Tatsushi Nomura; Yoshinori Sango, both of Machida; Toru Fujii, Yamato; Tetsuo Hattori, Yokohama, all of Japan

[73] Assignee: Nikon Corporation, Japan

[21] Appl. No.: 566,631

[22] Filed: Dec. 4, 1995

Related U.S. Application Data

[63] Continuation-in-part of Ser. No. 276,021, Jul. 15, 1994, Pat. No. 5,537,863.

[30] Foreign Application Priority Data

| Jul. 15, 1993 | [JP] | Japan | 5-175368 |
| Jul. 22, 1993 | [JP] | Japan | 5-180532 |
| Jul. 22, 1993 | [JP] | Japan | 5-180534 |
| Mar. 11, 1994 | [JP] | Japan | 6-040227 |
| Dec. 8, 1994 | [JP] | Japan | 6-305202 |

[51] Int. Cl.$^6$ ............................................. G01B 5/78
[52] U.S. Cl. ............................................. 73/105
[58] Field of Search .............................. 73/105; 250/306

[56] References Cited

U.S. PATENT DOCUMENTS

| 4,894,538 | 1/1990 | Iwatsuki et al. | 250/306 |
| 4,914,293 | 4/1990 | Hayashi et al. | 250/306 |
| 4,999,495 | 3/1991 | Miyata et al. | 250/306 |
| 5,083,022 | 1/1992 | Miyamoto et al. | 250/306 |
| 5,107,114 | 4/1992 | Nishioka et al. | 73/105 X |
| 5,117,110 | 5/1992 | Yasutake | 250/306 |
| 5,136,162 | 8/1992 | Miyamoto et al. | 250/306 |
| 5,142,145 | 8/1992 | Yasutake | 250/306 |
| 5,186,041 | 2/1993 | Nyyssonen | 73/105 |
| 5,231,286 | 7/1993 | Kajimura et al. | 250/306 X |
| 5,245,863 | 9/1993 | Kajimura et al. | 73/105 |
| 5,248,912 | 9/1993 | Zdeblick et al. | 73/105 X |
| 5,268,571 | 12/1993 | Yamamoto et al. | 250/306 |
| 5,276,672 | 1/1994 | Miyazaki et al. | 73/105 X |
| 5,296,704 | 3/1994 | Mishima et al. | 250/306 |
| 5,321,685 | 6/1994 | Nose et al. | 250/306 X |
| 5,329,122 | 7/1994 | Sakai et al. | 250/306 |
| 5,334,835 | 8/1994 | Nakayama et al. | 250/307 X |
| 5,388,452 | 2/1995 | Harp et al. | 250/306 X |
| 5,406,833 | 4/1995 | Yamamoto | 250/306 X |
| 5,408,094 | 4/1995 | Kajimura | 250/306 X |
| 5,506,829 | 4/1996 | Yagi et al. | 250/306 X |

FOREIGN PATENT DOCUMENTS

| 0 405 973 | 1/1991 | European Pat. Off. | |
| 296612 | 12/1991 | Japan | 73/105 |
| 350510 | 12/1992 | Japan | 73/105 |

OTHER PUBLICATIONS

Yasutake et al., "Scanning tunneling microscope combined with optical microscope for large sample measurement", J. Vac. Sci. Technol. A 8(1), Jan/Feb 1990, pp. 350–353.

Sakai, "Development of the Scanning Probe Microscope", Seimitsu Kougaku Kaishi, vol. 61, No. 1, 1995, pp. 53–58.

*Primary Examiner*—Hezron E. Williams
*Assistant Examiner*—Daniel S. Larkin
*Attorney, Agent, or Firm*—Pennie & Edmonds LLP

[57] ABSTRACT

Without necessitating complicated operations, an image of a low to medium magnification and an image of a high magnification are efficiently observed by an optical microscope and by an atomic force microscope, respectively. In the atomic force microscope, an atomic force microscope probe, whose size has been reduced since a device for detecting interatomic force is provided by a piezoelectric film, piezoresistance, or the like, is disposed between an objective lens of the optical microscope and a sample to be observed or at a position of the objective lens when the objective lens and the probe are constructed so as to be interchangeable, thereby enabling the optical microscope to confirm a scanning position of the atomic force microscope.

6 Claims, 41 Drawing Sheets

ATOMIC FORCE MICROSCOPE USING CANTILEVER ATTACHED TO OPTICAL MICROSCOPE

RELATED APPLICATIONS

This is a continuation-in-part application of application Ser. No. 08/276,021 filed on Jul. 15, 1994, now U.S. Pat. No. 5,537,863.

BACKGROUND OF THE INVENTION

1. Field of the Invention

The present invention relates to an atomic force microscope attached to an optical microscope and, in particular, to a small-sized atomic force microscope disposed at a position of an objective lens of the optical microscope.

2. Related Background Art

AFM (atomic force microscope) has a cantilever. As a measured sample approaches the cantilever, a force from the measured sample is exerted on the cantilever. The cantilever receiving the force is then deflected. Detecting an amount of the deflection, the force can be detected. If the measured sample is two-dimensionally moved relative to the cantilever, the cantilever receives the force changing in synchronization with the movement. Then, detecting the force synchronized with the movement, an image of the surface of the measured sample can be obtained.

FIG. 1H is a conceptual view showing a principle of an AFM. This AFM comprises a cantilever, which is composed of a needle-like chip having a small radius of curvature at its tip and a flexible plate, and a displacement detecting system which measures deflection (warp) of the flexible plate.

When the needle-like chip at the tip of the cantilever approaches a sample (to a distance of about 10 nm), the flexible plate deflects due to static electricity, magnetism, van der Waals force, and the like acting between the sample atom and the needle-like chip. The measurement is performed as the amount of displacement in this deflection is detected by the displacement detecting system.

Then, as the sample is scanned, two-dimensional information of the force in the sample surface is obtained. Also, when the sample is scanned while the position of the sample is controlled so as to make the deflection of the flexible plate constant, microscopic forms of the surface can be seen. For example, Japanese Unexamined Patent Publication Hei No. 3-218998 discloses a cantilever comprising a silicon substrate and an acute silicon chip united therewith or a cantilever comprising a silicon nitride substrate and an acute silicon chip.

Also, Japanese Unexamined Patent Publication Hei No. 1-262403 discloses, in addition to the above-mentioned cantilever, a cantilever having a structure in which a plate made of silicon is rotated.

As the displacement detecting system for detecting the displacement of the cantilever caused by a force received from the sample atom, types of tunnel detection, optical wave interference, and optical lever have been used.

However, in any of these types, since the movement of the needle-like chip is measured by relative displacement of the cantilever and the displacement detecting system with respect to each other, read-out error in displacement becomes greater when the displacement detecting system is not fixed with respect to the cantilever. Accordingly, the sample has conventionally been scanned while the cantilever and the displacement detecting system are fixed.

Since the displacement is optically detected, the detecting system must be large in all the above-mentioned types. In general, the AFM is a single apparatus. Accordingly, when a narrow specific area of a sample is to be observed, for example, an optical microscope having a magnification lower than that of the AFM is used to observe a wider area so as to determine a scanning area and then measure and record its accurate position. Thereafter, the AFM apparatus is set and positioned so as to effect scanning and observation. These steps are complicated. Also, when the sample to be observed is too large to be scanned with an actuator, the sample has to be broken and processed into small pieces. Therefore, the specific area of the sample to be observed has often been damaged or deformed so that it cannot be observed.

SUMMARY OF THE INVENTION

There have been trials for reducing the size of AFM by unifying the displacement detecting system with the cantilever. As effective techniques thereof, a cantilever in which a piezoelectric film type displacement sensor is disposed on and united with the AFM cantilever (Japanese Unexamined Patent Publication Hei No. 4-180786) and a cantilever in which a piezoresistance type displacement sensor is disposed on and united with the AFM cantilever have been proposed.

The inventors have taken account of the AFMs using these cantilevers and found that, when an optical microscope and an AFM are combined together, these small-sized AFM probes can be disposed between an objective lens of the optical microscope and the sample to be observed and that, when the objective lens and the AFM probe are constructed so as to be interchangeable, the probe can be disposed at a position of the objective lens. In any case, the scanning position of the AFM can be confirmed by the optical microscope. Based on these findings, the present invention has been attained.

Also, it has been understood that, in addition to the AFM using the piezoelectric film type displacement sensor or piezoresistance type cantilever, the present invention can also be applied to the conventionally-known AFMs using other displacement detecting techniques, such as those of optical lever and optical interference types, when their size is reduced or their positions are appropriately arranged.

The present invention is characterized in that, in an AFM, an AFM probe, whose size has been reduced since a means for detecting interatomic force is provided by a piezoelectric film, piezoresistance, or the like, is disposed between an objective lens of an optical microscope and a sample to be observed or at a position of the objective lens when the objective lens and the probe are constructed so as to be interchangeable, thereby enabling the optical microscope to confirm a scanning position of the AFM. In such a constitution, while an image of a low to medium magnification is observed by the optical microscope, without processing or moving the same sample, the scanning position is confirmed by the attached AFM so as to obtain an image of 100,000 to 1,00,000 magnifications.

Though a type in which a scan type actuator is disposed on the side of the AFM probe has been mainly explained in the present invention so that the size of the sample to be observed may not be taken into account, the above-mentioned effect can also be realized in the case where the scan type actuator is disposed on the side of the sample when the size of the sample to be observed is taken into consideration.

The surface of a sample is investigated with the scanning probe microscope. The scanning probe microscope comprises a cantilever for interaction with the surface, the cantilever having a self vibrator therein for vibrating said cantilever. More precisely, the cantilever itself vibrates in the direction of the thickness thereof when an ac voltage is applied to the cantilever. In addition, the cantilever can be arranged to extract a signal concerning an amount of strain thereon or an amount of displacement thereof from electrodes set on the cantilever.

The cantilever has a first portion and a second portion, said cantilever is fixed at said first portion, and said self vibrator is provided at least in said second portion. The self vibrator comprises a first layer of piezoelectric crystal, a first electrode formed on said first layer, and a second electrode formed on said first layer so that said first layer is located between said first electrode and second electrode. The cantilever also comprises a strain detector therein for detecting a strain of said cantilever using piezoelectric effect.

The self strain detector is formed on said self vibrator. The self strain detector comprises: a second layer of a piezoelectric crystal; a third electrode formed on said second layer; and a fourth electrode formed on said second layer so that said second layer is located between said third electrode and said fourth electrode.

More precisely, a scanning probe microscope comprises a microscope main body having a sample table and a cantilever having a first end portion and a second end portion, and the first end portion is set on the microscope main body. The second end portion has a pointed portion, and the pointed portion is arranged to relatively move with respect to the sample table. The cantilever comprises a plate disposed between the first end portion and the second end portion, and the plate can be deflected in a direction of the thickness thereof. The plate comprises the self strain detector for detecting a strain of the plate by itself and the self vibrator for vibrating the plate by itself in the direction of the thickness or in the direction of the first electrode to second electrode.

The plate further comprises a first insulator layer disposed between the second electrode of the self vibrator and the third electrode of the self strain detector, in order to electrically separate the second electrode from the third electrode.

The microscope main body of the scanning probe microscope further comprises an actuator. The actuator changes a positional relationship between the cantilever and the sample table with application of a voltage to the actuator. The actuator may be constructed of a tube type piezoelectric device. Driving the actuator, a probe as the pointed portion two-dimensionally scans the surface of the sample. Since a force acts between the pointed portion and atoms forming the sample surface, the plate of cantilever is deflected. Detecting an amount of deflection of the plate, a gap can be measured between the atoms and the pointed portion as the probe of cantilever. Two-dimensionally plotting measured gaps, an image of the sample surface can be measured at the atomic level.

The ac voltage from power supply is applied between the first electrode and the second electrode. With application of the ac voltage the cantilever vibrates in the direction of the thickness thereof. Applying the voltage to the electrodes, an amount of deflection of the plate is detected as an ac signal from the first and second electrode. In other words, a signal concerning the amount of deflection of the cantilever as extracted from the first electrode and the second electrode is input into a signal processing unit. The signal processing unit converts the ac signal into a signal having information on a gap between the pointed portion of the cantilever and the sample.

The plate further comprises a second insulator layer formed on the fourth electrode of the self strain detector so that the fourth electrode is disposed between the second layer and the second insulator layer. The second insulator increases the mechanical strength of the cantilever. The second insulator layer can be formed on the vibrator so that the first electrode is disposed between the first layer and the second insulator layer.

The first layer or the second layer is made of a material containing any one of lead titanate zirconate-lanthanum oxide, lead magnesium niobate-lead titanate, and barium titanate.

Further, the second insulator layer may be made of a material containing silicon nitride and the pointed portion (probe) may be made of a material containing silicon dioxide, which is advantageous in fabricating the cantilever. Namely, a silicon substrate is first prepared, and the substrate is reacted with nitrogen atoms, to form a silicon nitride film or layer on the silicon substrate. Then a local region of silicon nitride is etched into the silicon substrate, and the silicon substrate is further etched in the exposed region by the etching, forming a pore (pit) on the surface of the silicon substrate. Silicon dioxide is formed on the inner wall by oxidizing the inner wall on the pore. Further, the silicon substrate is removed by etching, whereby the pointed portion probe of silicon dioxide can be formed.

If the first layer or second layer is made of a material containing lead, the first layer and second layer will react with the first insulator or the second insulator layer. This reaction is not desired in respect of characteristics of the cantilever. The plate forming the cantilever further comprises a first buffer layer disposed between the first insulator layer and the second layer.

The second insulator layer is, for example, silicon nitride. If the second layer is made of a material containing lead, it is preferred that the plate further comprises a second buffer layer disposed between the second insulator layer and the second layer. The first or second buffer layer is made of a material containing any one of aluminum oxide, magnesium oxide, and chromium oxide.

Taking into consideration the electric resistance and the reactivity with the first layer or the second layer, it is desired that the first electrode, the second electrode, the third electrode or the fourth electrode is made of a material containing platinum, which has a low reactivity with the piezoelectric material and a relatively high electric conductivity among the metals.

Further, a cantilever according to the present invention comprises a substrate made of a material containing silicon, for example, silicon or silicon nitride. The substrate has a pointed portion for detecting a force acting between the atom forming the sample surface and the pointed portion. The cantilever comprises a first layer of piezoelectric crystal formed on the substrate made of a material containing lead. The first electrode is disposed between the substrate and the first layer, and the first electrode is made of a material containing platinum. The platinum reacts with neither the first layer containing lead or the substrate containing silicon at room temperature. Therefore, the first electrode suppresses an interaction of said substrate and said first layer. Still, the cantilever comprises a second electrode formed on the first layer so that the first layer is disposed between the first electrode and the second electrode. The cantilever may comprise a buffer layer disposed between the first layer and the said substrate, and the buffer layer is made of a material containing any one of aluminum oxide, magnesium oxide, and chromium oxide.

Further, the first electrode or the fourth electrode contacted with silicon is preferably made of a material further containing titanium or tantalum. The use of titanium or tantalum enhances resistance to peeling-off from the silicon substrate or layer. Also, the use of titanium or tantalum can prevent silicon atoms from penetrating the first electrode or fourth electrode to mix into the first layer or second layer in fabrication steps of the cantilever.

The self vibrator of the present invention may have another arrangement (arrangement A). Namely, the self vibrator may have a third electrode formed on the first layer so that the first layer is disposed between the first electrode and the third electrode. In this arrangement, the plate may comprise an insulator layer formed on the second electrode so that the first electrode is disposed between the first layer and the insulator layer.

The microscope may further comprise an actuator for moving the cantilever relative to the sample table, a power supply for applying an ac voltage between the first electrode and the second electrode, or a signal processing unit for processing a signal concerning an amount of a strain of the cantilever, as extracted from the first electrode and the third electrode.

The first layer is made of a material containing any one of lead titanate zirconate-lanthanum oxide, lead magnesium niobate-lead titanate, and barium titanate.

Similarly as above, the buffer layer can also be used in case of the self vibrator of this arrangement being used.

In the arrangement A, the plate may further comprise a fourth electrode. The fourth electrode is formed on the first layer so that the first layer is disposed between the first electrode and the fourth electrode and that the first electrode is disposed between the third electrode and the fourth electrode. In this arrangement, the third electrode is sandwiched between the second electrode and the fourth electrode. Applying the ac voltage to the first electrode to vibrate the cantilever and using the pair of the third electrode and the fourth electrode to extract a signal, the signal can be attained with high detection accuracy. Still, the second electrode is connected to ground. Specifically defining the positions of the electrodes, the first electrode, the third electrode, and the fourth electrode are arranged in the same plane but the first electrode, the second electrode, and the third electrode are not arranged in the same plane.

If the first layer is set through the second electrode on the silicon layer, it is desirable that the second electrode comprises a platinum layer, the platinum layer being formed on the first layer, and a titanium layer. The titanium layer is formed on the platinum layer so that the platinum layer is disposed between the first layer and the titanium layer. The titanium layer functions as barrier metal for restricting the diffusion of silicon atoms from the silicon layer into the first layer. The adhesion between the titanium layer and the silicon layer is higher than that between the silicon layer and the platinum layer. If the titanium layer is interposed between the platinum layer and the silicon substrate, the platinum layer and the silicon substrate become resistant to peeling-off.

Also, the second electrode may comprise a platinum layer, the platinum layer being formed on the first layer, and a tantalum layer. The tantalum layer is formed on the platinum layer so that the platinum layer is disposed between the first layer and the tantalum layer. The tantalum layer has the same function (increasing the adhesion therebetween) as the titanium layer. Since the tantalum is unlikely to form silicide, the use of tantalum is effective. The thickness of the tantalum or titanium layer is preferably not less than 10 nanometers taking the adhesion into account. Taking the diffusion of silicon into consideration, the thickness is preferably not less than 100 nanometers. Further, the thickness of the platinum layer is preferably not less than 20 nanometers for growth of the first layer. The thickness of the platinum layer is preferably not less than 200 nanometers for stress relaxation between the first layer and the silicon substrate.

The scanning probe microscope of the present invention further comprises impedance measuring means for measuring an impedance of the first layer, wherein the self vibrator shares the first layer, the first electrode, and the second electrode with the self strain detector. The microscope may comprise a power supply for applying an ac voltage between the first electrode and the second electrode. The frequency of the ac voltage is close to a resonance frequency of the cantilever to such an extent that the impedance of the first layer changes when the cantilever receives a force. The impedance measuring means is connected between the first electrode and the second electrode to detect the impedance between the first electrode and the second electrode.

The microscope may further comprise an actuator electrically connected to the impedance measuring means, for moving the measured sample in a direction in which the cantilever is displaced with application of the ac voltage; and actuator controlling means for controlling the actuator so that the impedance measured by the impedance measuring means is kept constant, so as to move the measured sample. In this case, the first layer constitutes a part of a feedback circuit. In the above cantilever, it is preferable that the first layer is crystallographically oriented.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1O is a view of a microscope in accordance with another embodiment.

DESCRIPTION OF THE PREFERRED EMBODIMENTS

Figure 1A:
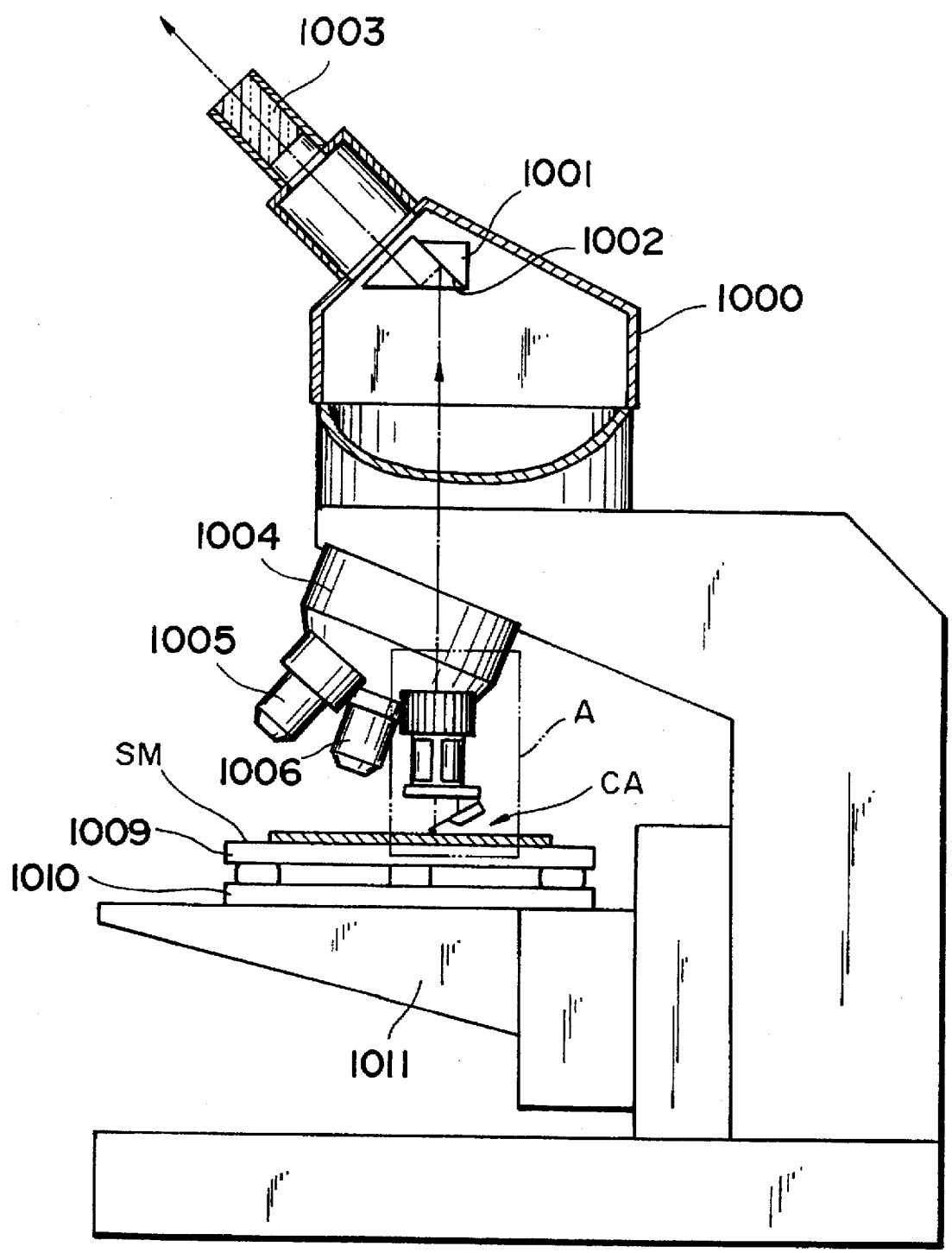
FIG. 1A is a side view of a microscope.

The present invention will be described in detail as to preferred embodiments of scanning probe microscope with reference to the accompanying drawings. In the description, like elements will be denoted by same reference numerals and redundant description will be avoided. Although scanning probe microscopes in the following description are atomic force microscopes, it should be noted that the below-described microscopes can be also applied to scanning tunneling microscopes.

First described is a cantilever, which is a probe for an atomic force microscope. The cantilever is produced using the method shown in FIG. 1P thru FIG. 4. As shown in FIG. 1P, silicon nitride layers 1, 4 are first formed by the chemical vapor deposition (CVD) process on two surfaces perpendicular to the direction of the thickness of (100) silicon (Si) substrate 2. One silicon nitride layer 4 is etched in a region at one end thereof by the reactive dry etching method. A pore is formed by the etching in the depth a little deeper than the thickness of silicon nitride layer 4. This means that the silicon nitride layer 4 is etched before the pore is formed ranging from the surface into the silicon substrate 2. The silicon substrate 2 is further etched by anisotropic etching using potassium hydroxide in the region exposed by the etching of silicon nitride layer 4, so that the silicon substrate 2 has a pit in this region. The depth of the pit is shallower than the thickness of silicon substrate 2. Silicon substrate 2 is oxidized in the pit-formed region, so that a silicon dioxide layer 3 is formed as tapered to a point toward the silicon nitride layer 1 and covering the silicon substrate 2 in this region. The silicon dioxide layer 3 is to serve as a probe (pointed portion) 3, because the distal end thereof is pointed. Further, a platinum electrode 5 is formed on the silicon nitride layer 4 using the photolithography technology. The platinum layer 5 is disposed between the silicon nitride substrate or layer 4 and PZT layer, and the platinum layer 5 suppresses an interaction of the PZT layer 6 and silicon nitride substrate 4. In other words, the platinum layer reacts with neither the silicon nitride substrate 4 nor PZT layer 6 at room temperature, and improves the characteristics of the cantilever.

Figure 2:
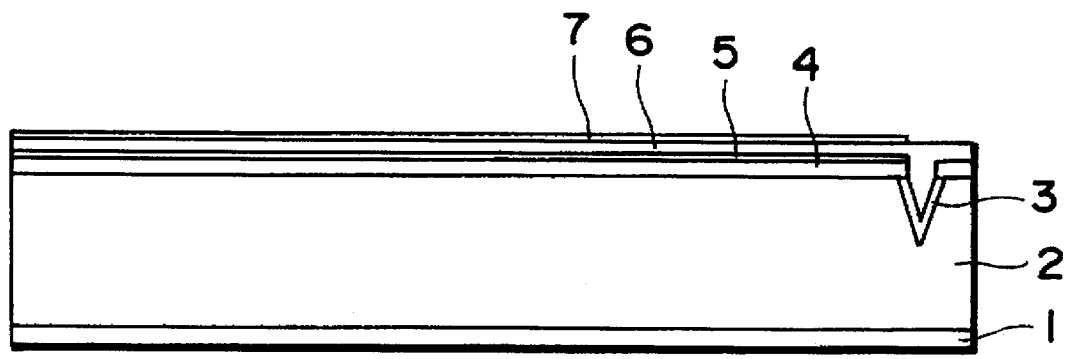
FIG. 2 is a cross section of a cantilever intermediate to illustrate a step for fabricating the cantilever.

Lead zirconate titanate (PZT) layer 6 is next formed on the platinum electrode 5 in the thickness of 0.5 micron (micrometer) by the sputtering method, as shown in FIG. 2. Platinum electrode 7 is further formed on the PZT layer 6 by the photolithography technology.

Figure 3:
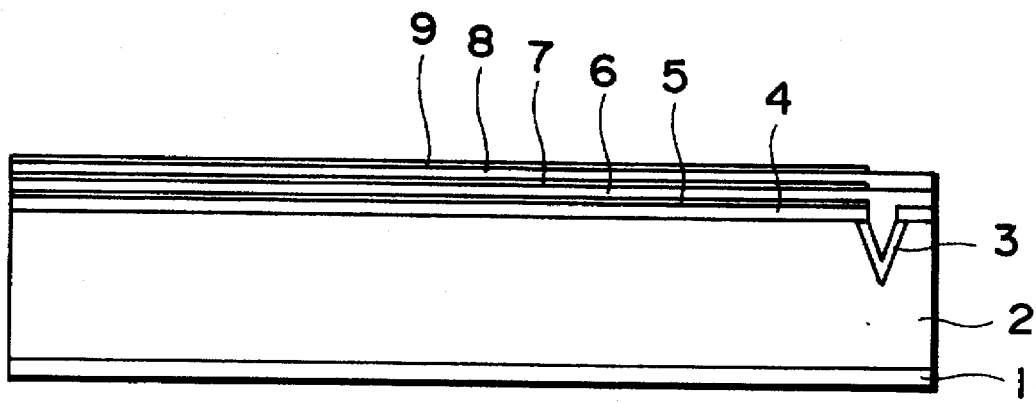
FIG. 3 is a cross section of a cantilever intermediate to illustrate a step for fabricating the cantilever.

Silicon nitride layer 8 is next formed on the platinum electrode 7 in the thickness of 0.5 micron by the CVD process, as shown in FIG. 3. Platinum electrode 9 is further formed on the silicon nitride layer 8.

Figure 4:
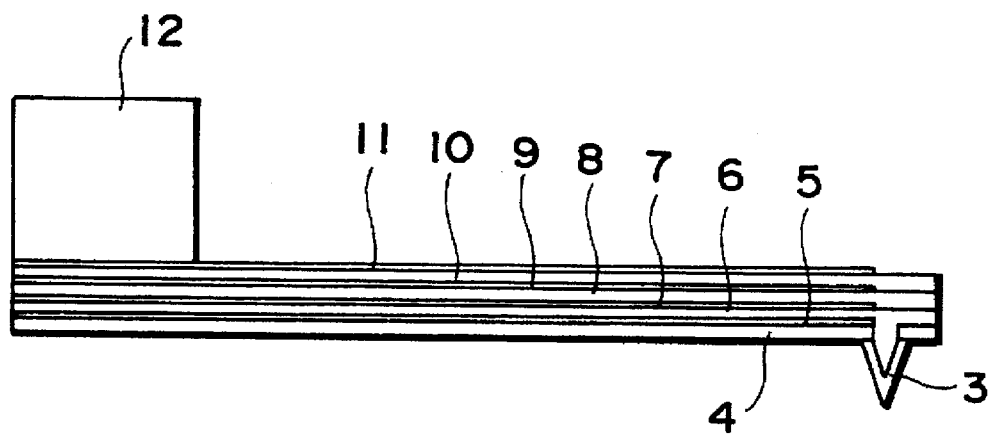
FIG. 4 is a cross section of a cantilever product to illustrate a step for fabricating the cantilever.

Lead zirconate titanate (PZT) layer 10 is next formed on the platinum electrode 9 in the thickness of 0.5 micron (micrometer) by the sputtering method, as shown in FIG. 4. Further, platinum electrode 11 is formed on the PZT layer 10 by the photolithography technology. The silicon nitride layer 1 shown in FIG. 3 is next removed by the reactive dry etching process. Further, the silicon substrate 2 shown in FIG. 3 is etched by the anisotropic etching before the silicon nitride layer 4 is exposed, thus removing the silicon substrate 2. This etching makes a surface of silicon dioxide layer 3 exposed, and the exposed layer is to function as a probe 3. Glass block 12 for chucking is electrostatically adhered onto the platinum electrode 11 on the opposite side to the probe 3. The thickness of each platinum electrode 5, 7, 9, 11 is about 50 nanometers. The contour of the cantilever is rectangular and the size is 20 microns×50 microns.

Figure 5:
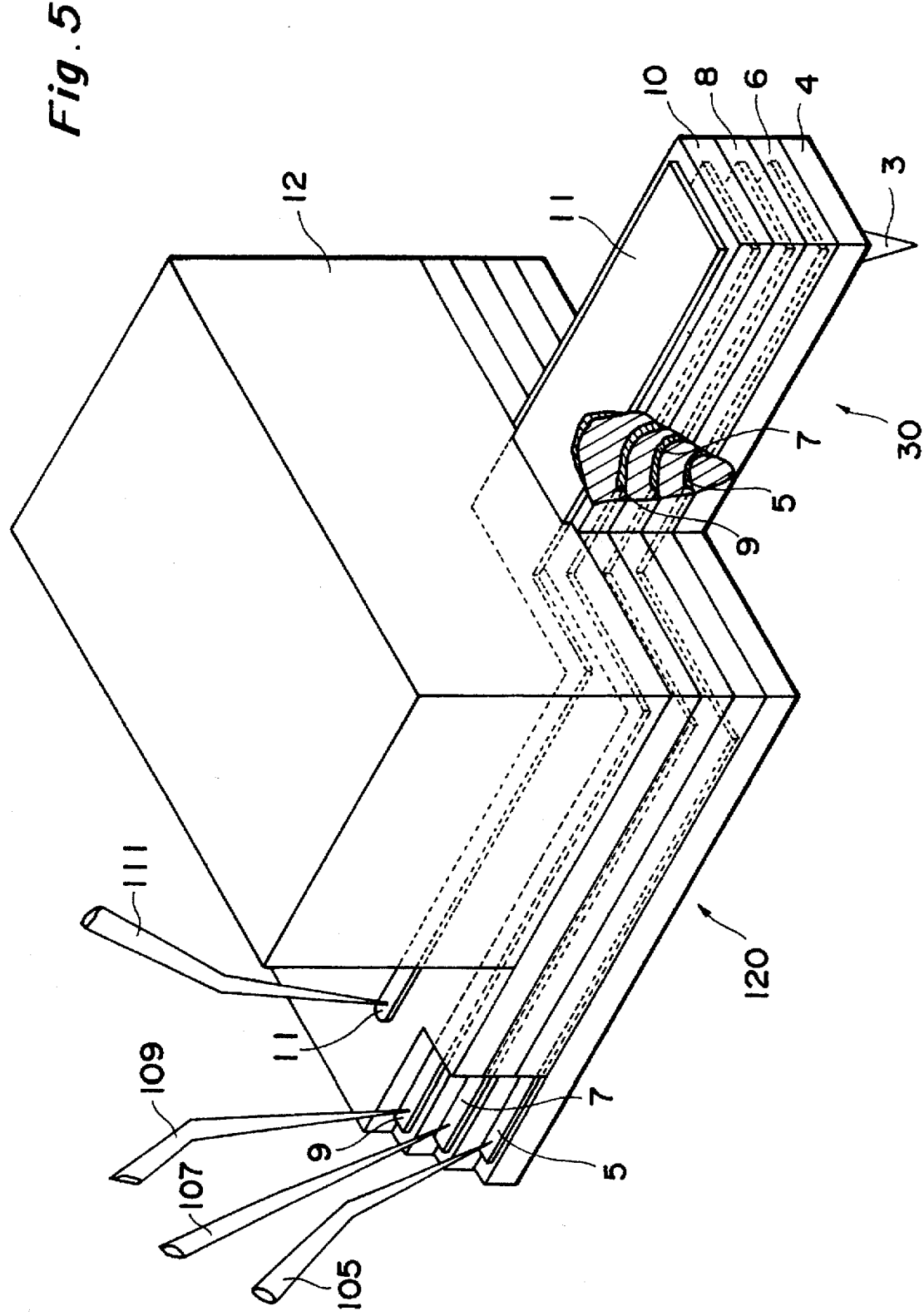
FIG. 5 is a perspective view, partly in cross section, of the cantilever shown in FIG. 4.
Figure 6:
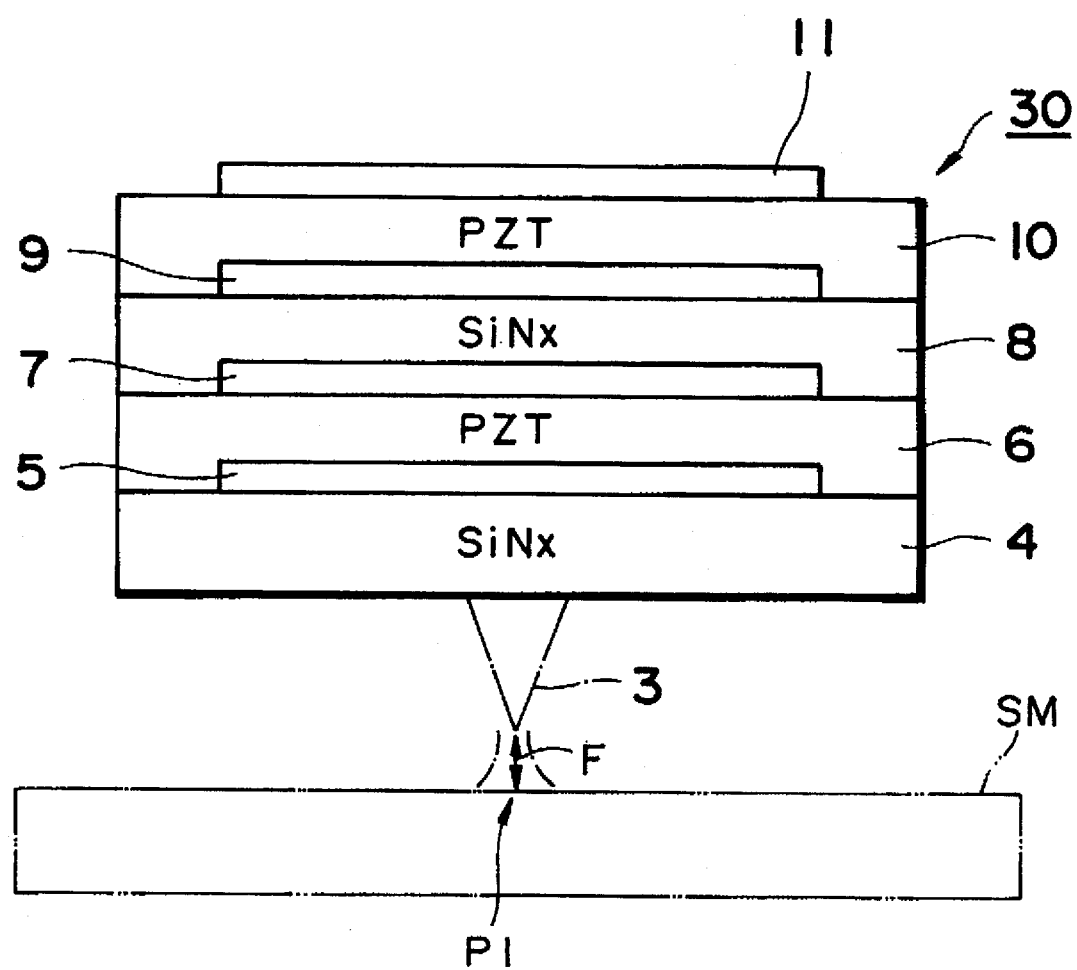
FIG. 6 is a cross sectional view of the part of the cross section in the cantilever shown in FIG. 5.

FIG. 5 is a perspective view, partly in cross section, of the cantilever shown in FIG. 4. The cantilever is composed of a cantilever body 120 as a portion where the glass block 12 is formed and a probe portion 30 as a portion where no glass block 12 is formed but the probe 3 is formed. Lead pins 105, 107, 109, 111 are electrically connected to the platinum electrodes 5, 7, 9, 11, respectively, formed in the cantilever body 120. Lead pin 109 and lead pin 107 are connected to the ground. Lead pin 111 is connected to a drive power supply not shown. Lead pin 105 is connected to a signal processing unit not shown. FIG. 6 shows a cross section of the broken part of FIG. 5. Successively deposited on the silicon nitride layer 4 are platinum electrode 5, PZT layer 6, platinum electrode 7, silicon nitride layer 8, platinum electrode 9, PZT layer 10, and platinum electrode 11. The platinum electrode 9, PZT layer 10 and platinum electrode 11 function as an actuator for vibrating the cantilever. An ac voltage is applied between platinum electrode 9 and platinum electrode 11 whereby the piezoelectric effect vibrates PZT layer 10 between the electrodes 9 and 11. The probe 3 is formed under the silicon nitride layer 4. When the probe 3 is brought closer to a first position P1 on the surface of a measured sample SM, an interatomic force works between probe 3 and sample SM. This force deflects the probe portion 30 of cantilever. Then the probe portion 30 of cantilever receives a stress. The platinum electrode 5, PZT layer 6, and platinum electrode 7 function as a displacement sensor for detecting a displacement of the cantilever. Since the PZT layer 6 is sandwiched between platinum electrode 5 and platinum electrode 7, the deflection of cantilever produces an induced voltage due to the piezoelectric effect between platinum electrode 5 and platinum electrode 7. Effecting signal processing for acoustic sonar on the induced voltage, an amount of the displacement of probe portion 30 of the cantilever can be obtained, and the stress on the probe portion 30 of cantilever can be detected.

The actuator of platinum electrode 9, PZT layer 10, and platinum electrode 11 may be used as a displacement sensor for extracting the signal while the platinum electrode 5, PZT layer 6, and platinum electrode 7 are arranged to function as an actuator with application of ac voltage. In other words, these actuator and displacement sensor can mutually exchange their functions depending upon applications.

Figure 7:
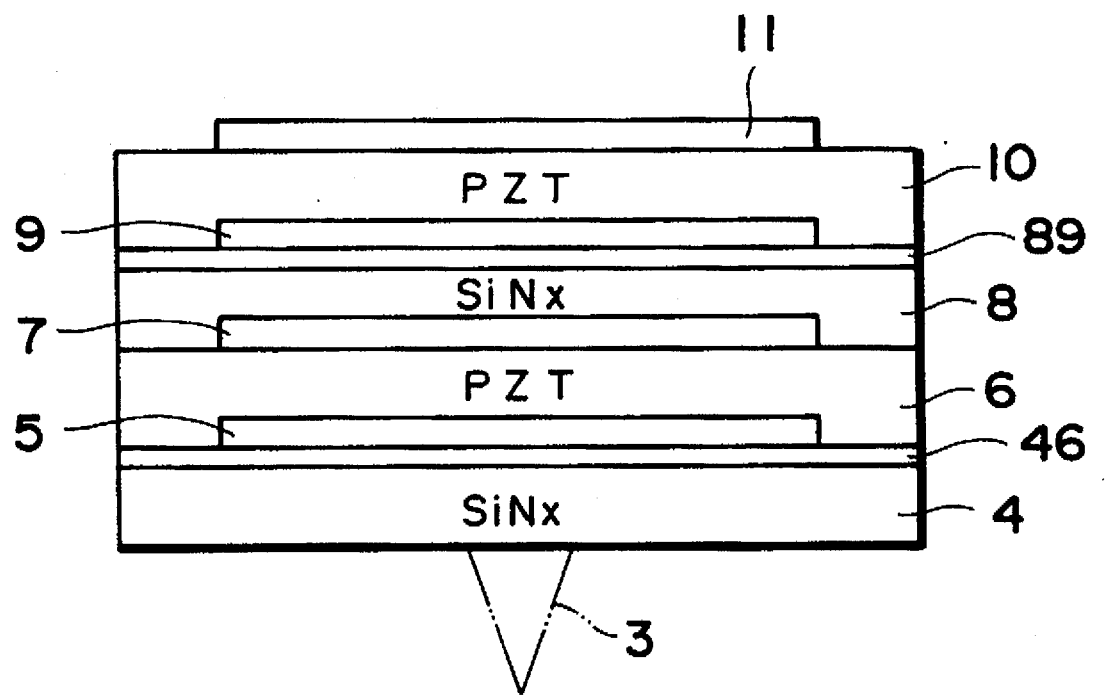
FIG. 7 is a cross sectional view of a cantilever drawn by the same method of expression as FIG. 6.

FIG. 7 shows a modification of the layer structure of the cantilever shown in FIG. 6. PZT is a material abundant in reactivity, which readily reacts with silicon or silicon nitride. This reaction is not favorable for accurate detection of interatomic force. Therefore, a buffer layer 46 is interposed between silicon nitride layer 4 and PZT layer 6. Further, a buffer layer 89 is also interposed between silicon nitride layer 8 and PZT layer 10. A material for the buffer layers may be selected from oxides such as aluminum oxide, magnesium oxide, magnesium aluminate, or chromium oxide.

Figure 8:
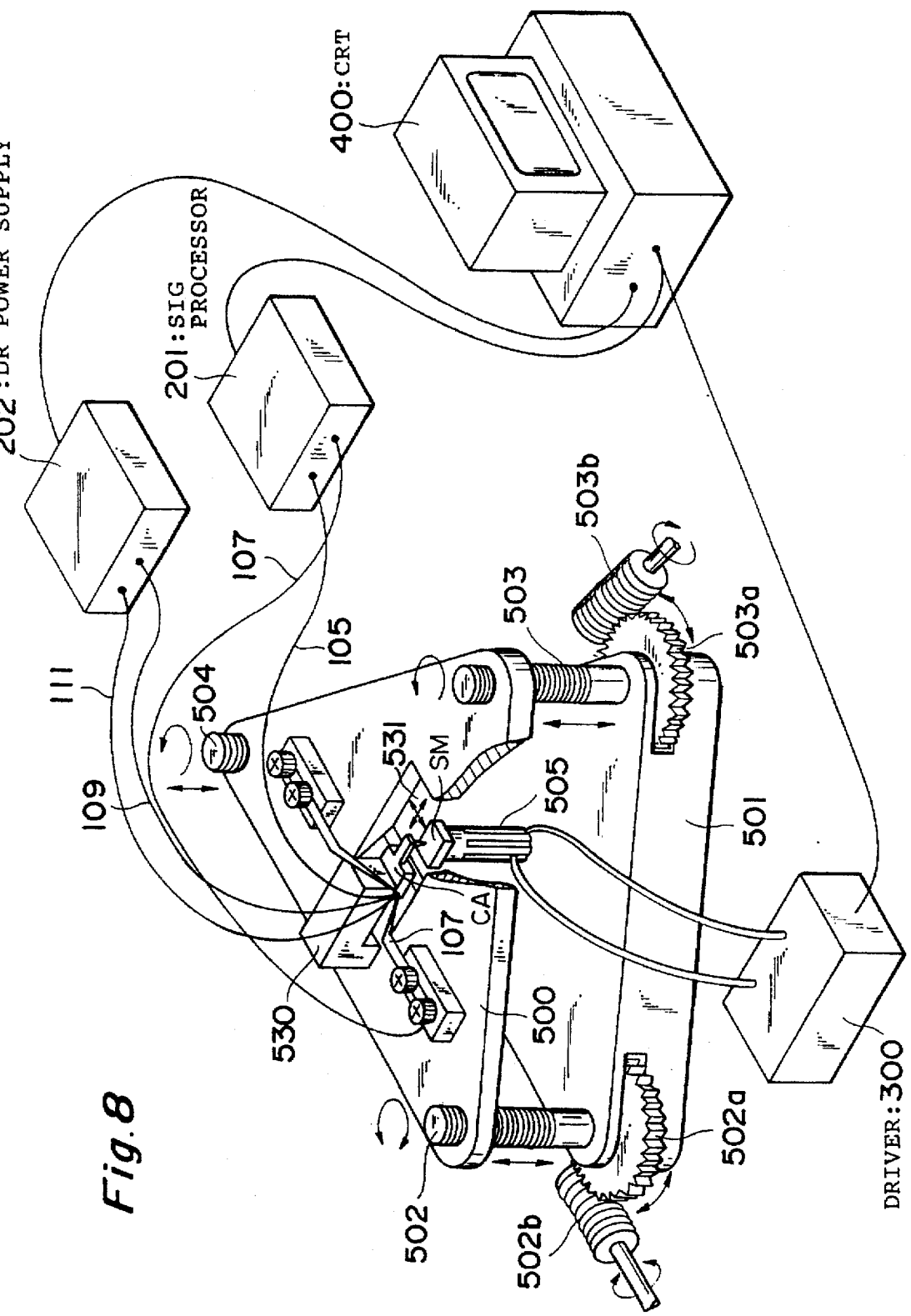
FIG. 8 is a perspective view, partly in cross section, of an atomic force microscope according to the present invention.

FIG. 8 is a perspective view, partly in cross section, to show the structure of an atomic force microscope using the cantilever CA shown in FIG. 1P thru FIG. 7. There are a triangular upper plate 500 and a triangular lower plate 501 opposed to each other. A rectangular hole 531 is formed nearly at the center of upper plate 500 therethrough in the direction of the thickness. A holding member 530 is fixed on the upper surface of upper plate 500. The holding member 530 extends from the surface of upper plate 500 to above the through hole 531, and a hole for the glass block 12 to be fit therein is formed in the lower surface of holding member 530 above the through hole 531. The glass block 12 of cantilever CA is set in the hole, so that the cantilever CA is fixed on the holding member 530 with the distal end of probe 3 being directed downward.

Three holes are formed near the corners of triangular upper plate 500 to penetrate through the microscope main body upper plate 500 in the direction of the thickness. A thread is cut on the inner surface of each hole. Worm 502, 503, 504 is set through each of the three through holes. The lower end of worm 502, 503, 504 is set in the lower plate 501 so as to be axially movable. Gear 502a, 503a is set on the circumference of worm 502, 503, respectively. Another gear is set on the circumference of worm 504. Gear 502a is in mesh with worm 502b. Rotating the worm 502b, the worm 502 rotates to adjust a gap between upper plate 500 and lower plate 501. Since a plane can be specified by three points, the orientation of upper plate 500 can be arbitrarily adjusted relative to the lower plate 501 by rotating the worms 502, 503, 504.

Lead pins 105, 107, 109, 111 are connected to the cantilever CA, as shown in FIG. 5. The lead pins 105, 107 are connected to a signal processing unit 201, and the lead pins 109, 111 to a drive power supply 202. Supplying an ac voltage from the drive power supply 202 to the cantilever CA, the cantilever CA vibrates. A measured sample SM is set below the probe 3 located at the fore end of cantilever CA. The sample SM is set on a tube actuator 505, and the tube actuator 505 serves as a sample table. The actuator 505 moves in a three-dimensional space when a voltage is applied thereto. The actuator 505 is connected to a drive control unit 300. A signal from the drive control unit 300 drives the actuator 505 to move the sample set on the actuator 505 in a three-dimensional space. Thus, the sample SM is moved relative to the cantilever CA, so that the probe 3 of cantilever CA scans the surface of sample SM. Processing a signal from cantilever CA by the signal processing unit 201, a two-dimensional image of sample surface can be observed. The two-dimensional image of sample is indicated on a display of computer 400. The computer 400 is connected to drive power supply 202, signal processing unit 201, and drive control unit 300, controlling the system of atomic force microscope.

Figure 10:
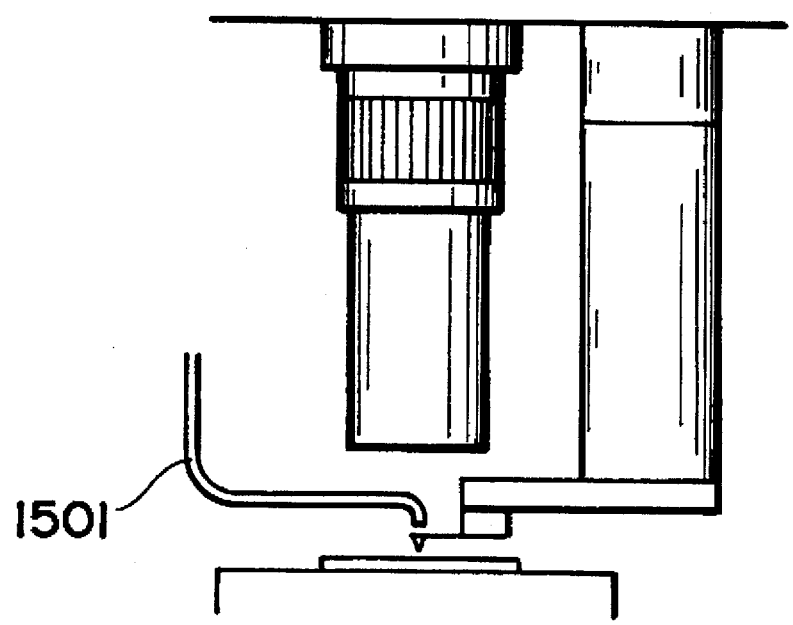
FIG. 10 is a perspective view, partly in cross section, of the cantilever shown in FIG. 9.
Figure 9:
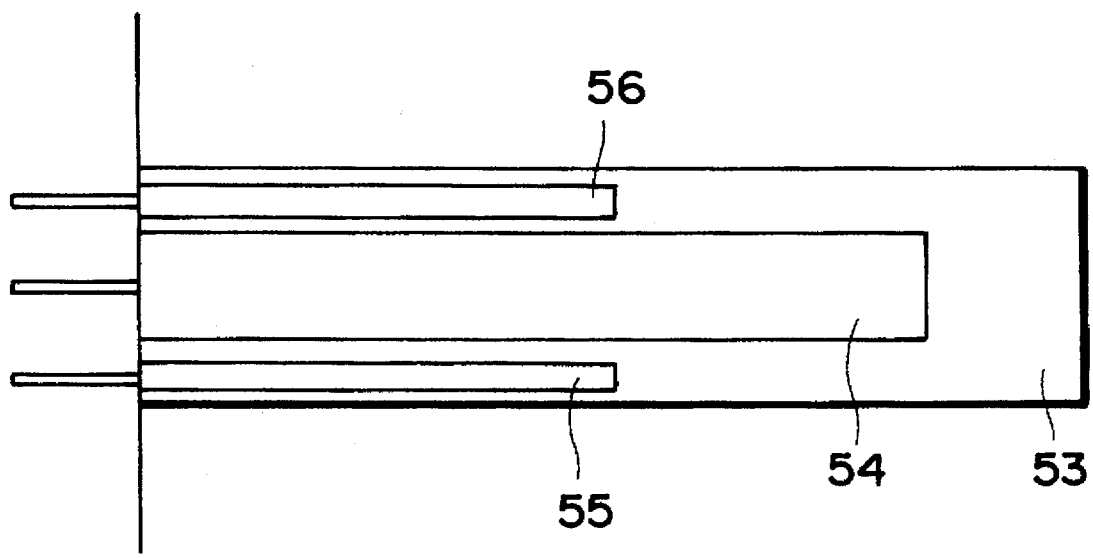
FIG. 9 is a plan view of a cantilever.
Figure 10:
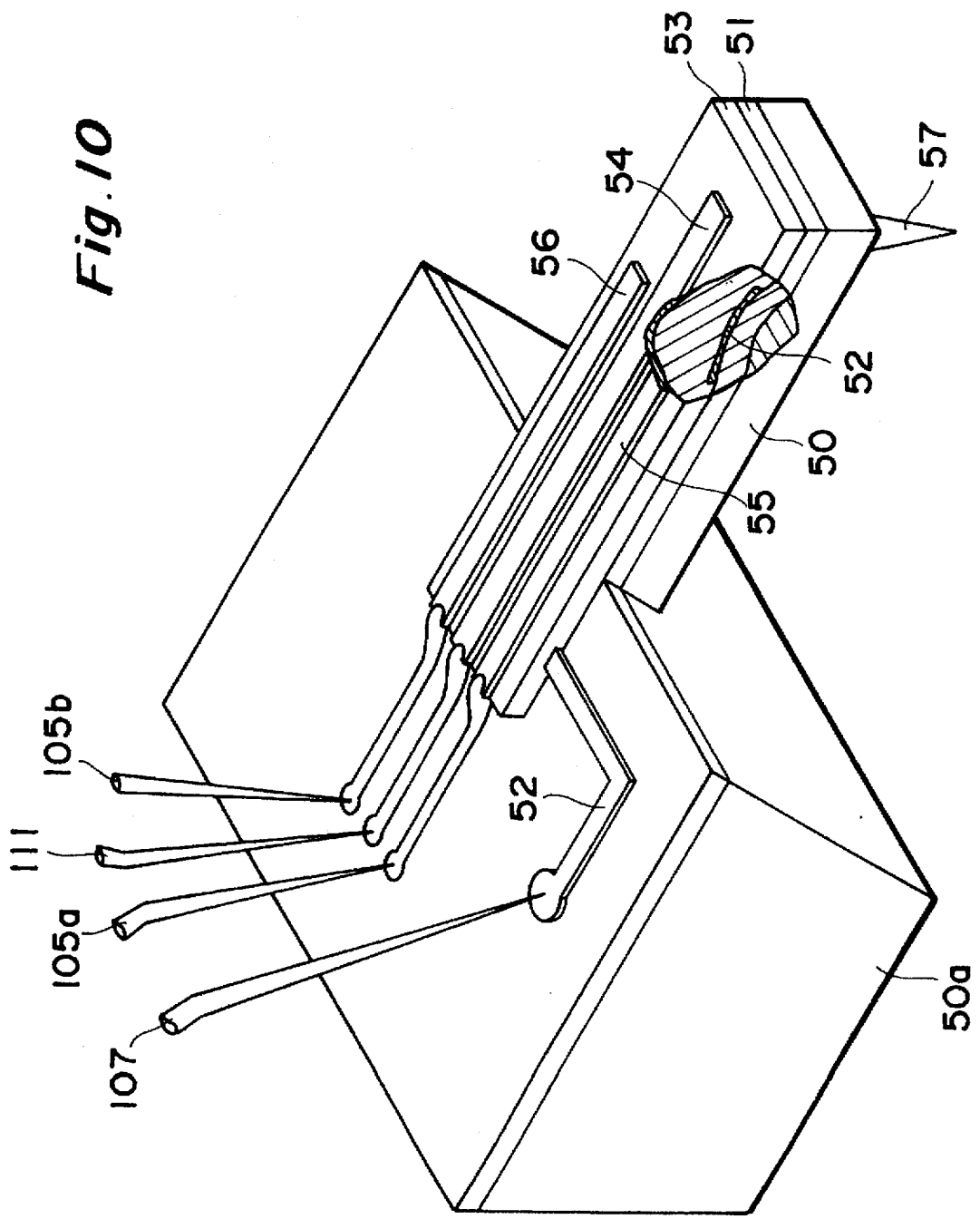
Figure 11:
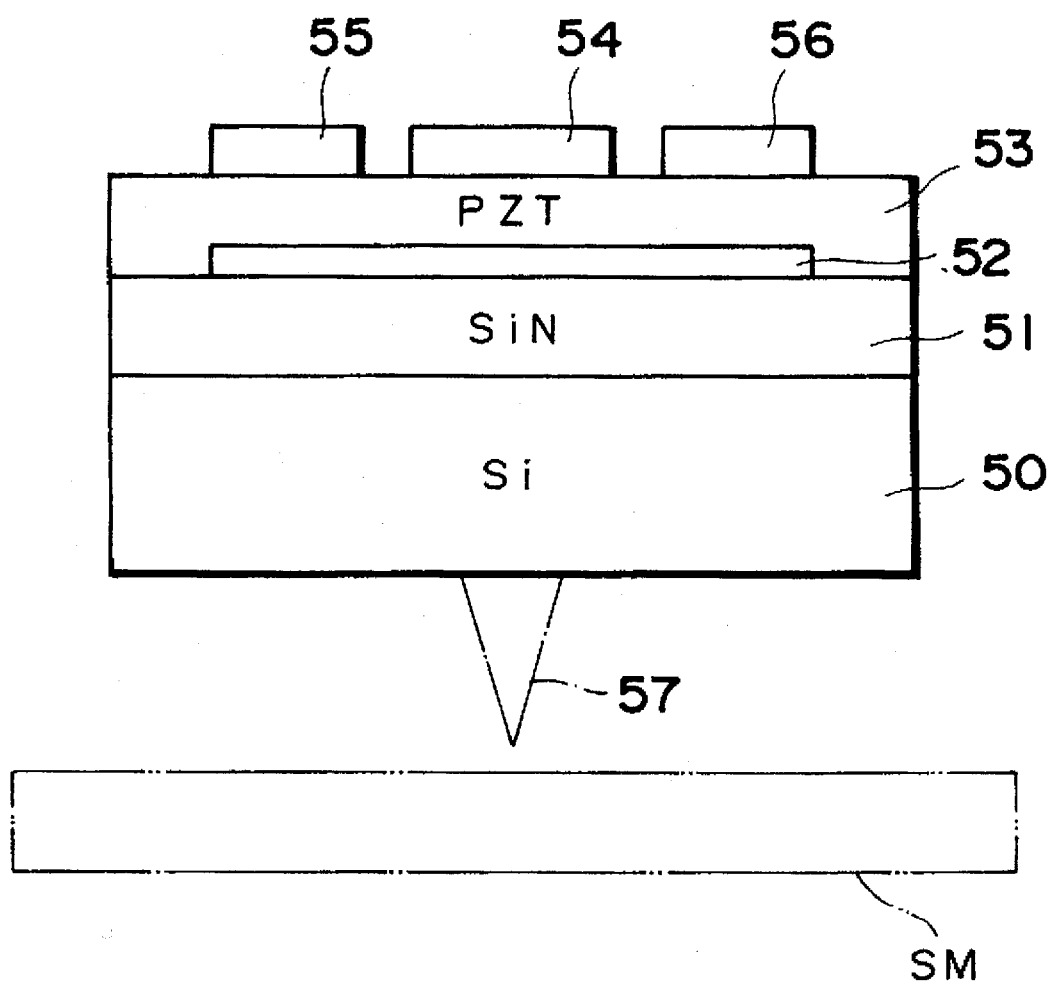
FIG. 11 is a cross sectional view of the part of the cross section in the cantilever shown in FIG. 10.

FIG. 9 is a plan view of a cantilever used in atomic force microscopes. This cantilever is a modification of the cantilever shown in FIG. 5. FIG. 10 is a perspective view, partly in section, of the cantilever shown in FIG. 9. FIG. 11 is a cross sectional view of the broken part in FIG. 10. Silicon nitride layer 51, platinum electrode 52, and PZT layer 53 are formed on silicon substrate 50. Platinum electrodes 54, 55, 56 are formed on PZT layer 53 so as to extend in the longitudinal direction of the cantilever. These platinum electrodes 54, 55, 56 are arranged in parallel with each other. The platinum electrode 54 is located between platinum electrodes 55 and 56. A probe 57 of silicon dioxide is formed on the lower surface of silicon substrate 50. Platinum electrodes 52, 55, 54, 56 are connected to lead pins 107, 105a, 111, 105b, respectively. The lead pin 107 is connected to the ground while the lead pins 105a and 105b to a signal processing unit not shown. Also, the lead pin 54 is connected to a drive power supply not shown. When an ac voltage is applied between lead pins 54 and 52, the cantilever vibrates because of the piezoelectric effect. As the probe 57 is brought closer to a measured sample SM, an interatomic force works between probe 57 and sample SM, deflecting the cantilever. The deflection of cantilever produces an induced voltage based on the piezoelectric effect between platinum electrodes 55, 56 and 52. Measuring the induced voltage, an amount of the deflection of cantilever can be known. Since an amount of the deflection of cantilever corresponds to a three-dimensional configuration of atoms on the surface of measured sample, the signal processing unit can convert the amount of deflection into information about configuration of atoms.

Figure 12:
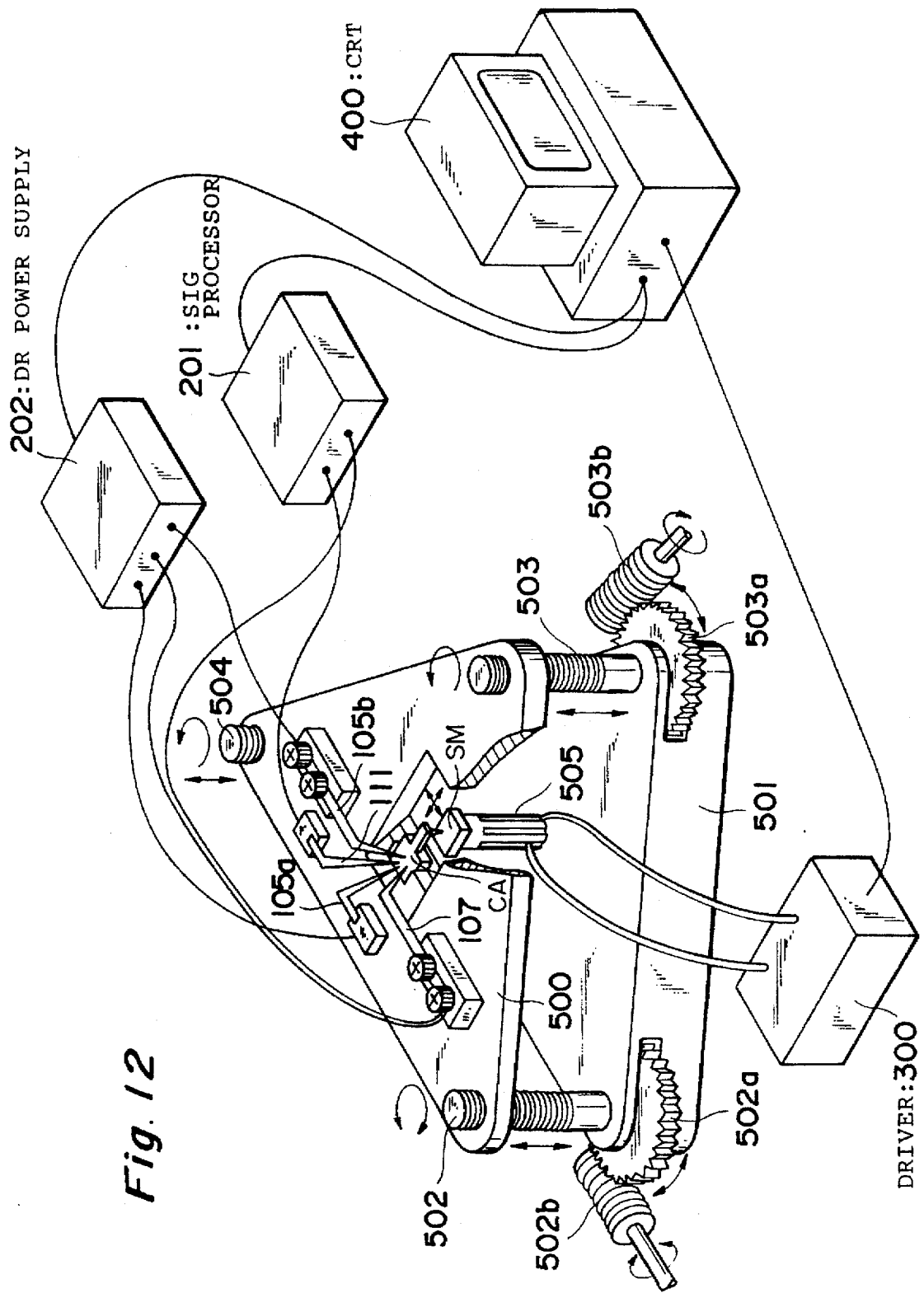
FIG. 12 is a perspective view, partly in cross section, of an atomic force microscope according to the present invention.

FIG. 12 is a perspective view to show an atomic force microscope using the cantilever. This system of microscope is substantially the same as the atomic force microscope shown in FIG. 8 except for the shape of the cantilever and the way of connection of the lead pins. Other elements in this microscope are the same as those in the microscope shown in FIG. 8. The lead pin 107 shown in FIG. 10 is connected to the ground, and the lead pin 111 to the drive power supply 202. An ac voltage is supplied from the drive power supply 202 to the lead pin 111. Lead pins 105a, 105b are connected to the signal processing unit 201. A signal from the cantilever is input into the signal processing unit 201, where the same signal processing as that for acoustic sonar is carried out. An image of the surface of sample SM is indicated on computer 400.

Figure 13:
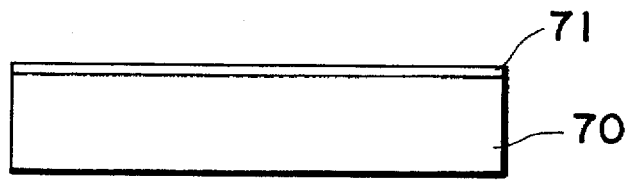
FIG. 13 is a cross sectional view of a cantilever intermediate to illustrate a step for fabricating a cantilever.
Figure 14:
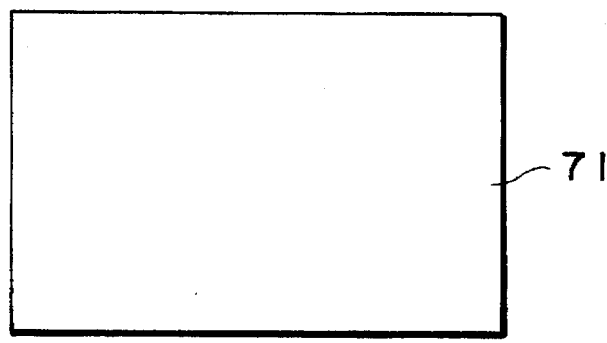
FIG. 14 is a plan view of the cantilever intermediate shown in FIG. 13.
Figure 15:
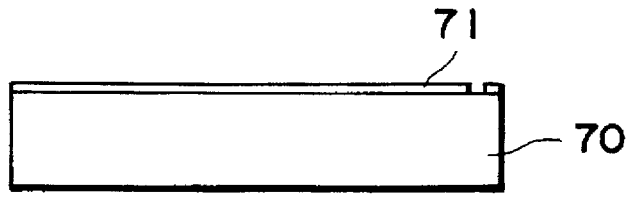
FIG. 15 is a cross sectional view of a cantilever intermediate to illustrate a step for fabricating the cantilever.
Figure 16:
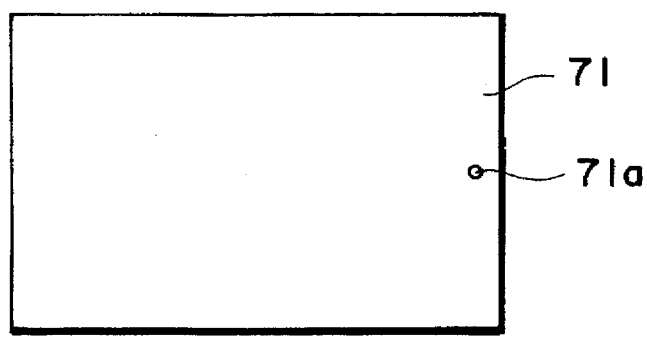
FIG. 16 is a plan view of the cantilever intermediate shown in FIG. 15.
Figure 17:
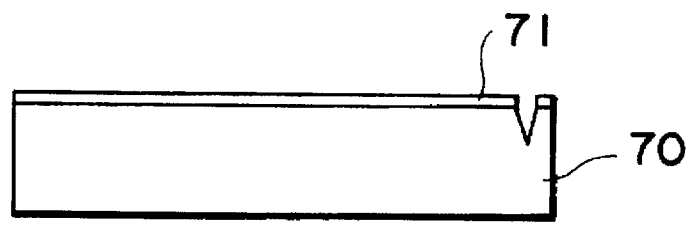
FIG. 17 is a cross sectional view of a cantilever intermediate to illustrate a step for fabricating the cantilever.
Figure 18:
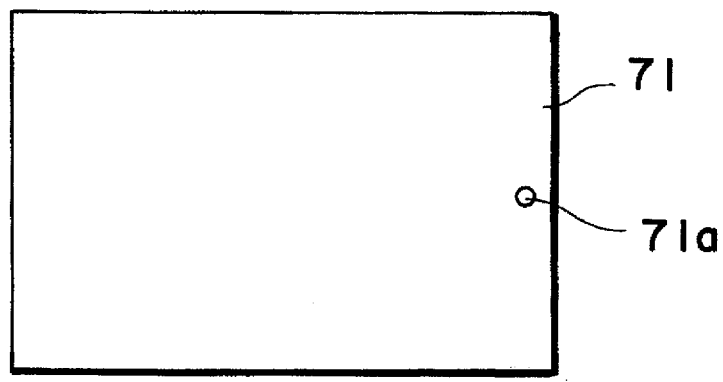
FIG. 18 is a plan view of the cantilever intermediate shown in FIG. 17.
Figure 19:
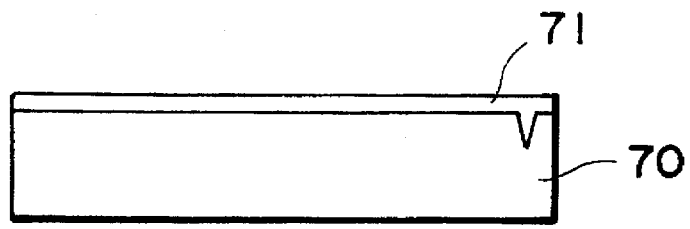
FIG. 19 is a cross sectional view of a cantilever intermediate to illustrate a step for fabricating the cantilever.
Figure 20:
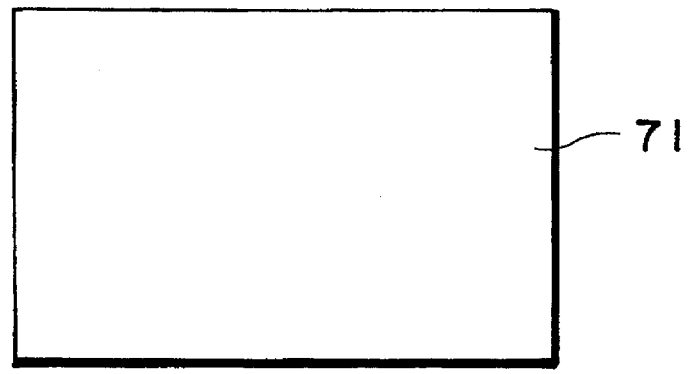
FIG. 20 is a plan view of the cantilever intermediate shown in FIG. 19.
Figure 21:
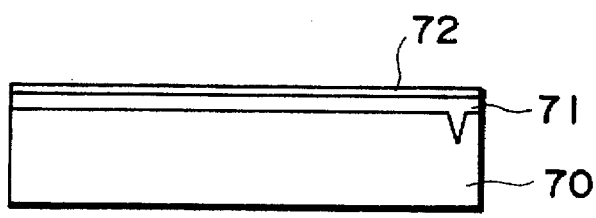
FIG. 21 is a cross sectional view of a cantilever intermediate to illustrate a step for fabricating the cantilever.
Figure 22:
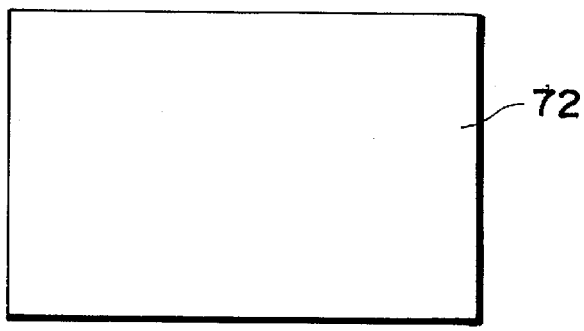
FIG. 22 is a plan view of the cantilever intermediate shown in FIG. 21.
Figure 23:
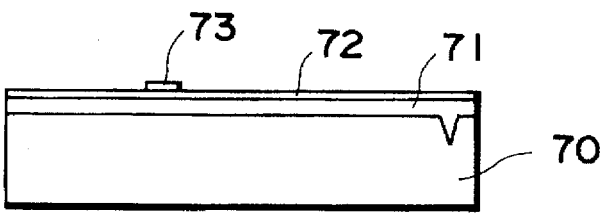
FIG. 23 is a cross sectional view of a cantilever intermediate to illustrate a step for fabricating the cantilever.
Figure 24:
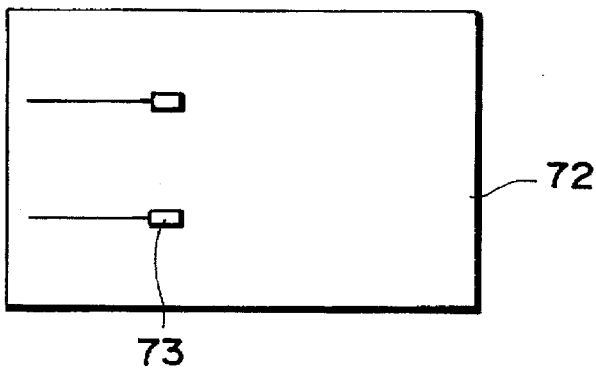
FIG. 24 is a plan view of the cantilever intermediate shown in FIG. 23.
Figure 25:
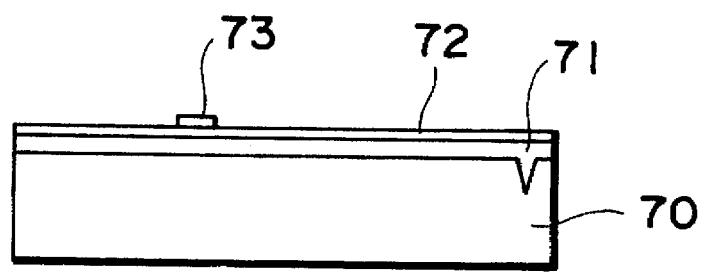
FIG. 25 is a cross sectional view of a cantilever intermediate to illustrate a step for fabricating the cantilever.
Figure 26:
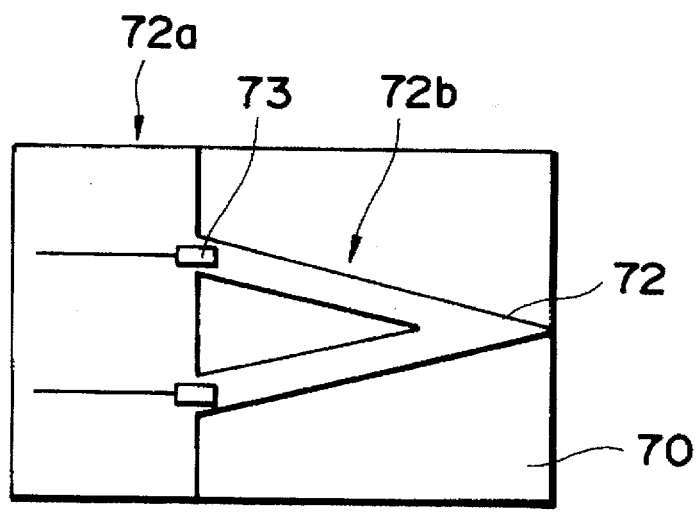
FIG. 26 is a plan view of the cantilever intermediate shown in FIG. 25.
Figure 27:
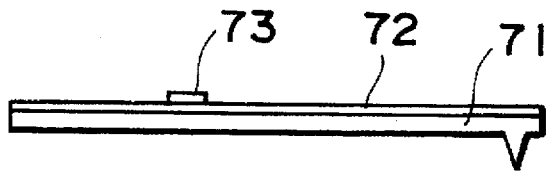
FIG. 27 is a cross sectional view of a cantilever intermediate to illustrate a step for fabricating the cantilever.
Figure 28:
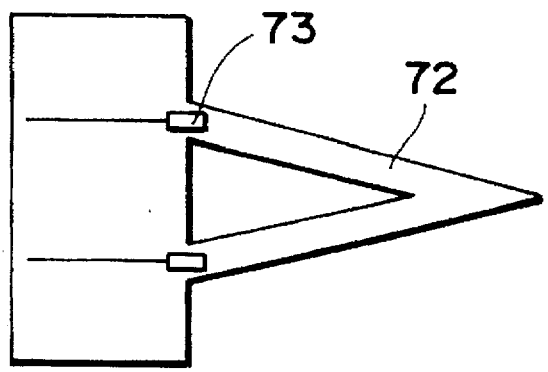
FIG. 28 is a plan view of the cantilever intermediate shown in FIG. 27.
Figure 29:
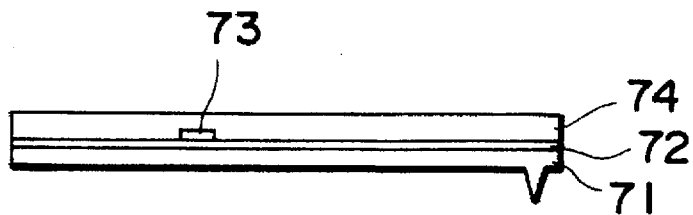
FIG. 29 is a cross sectional view of a cantilever intermediate to illustrate a step for fabricating the cantilever.
Figure 30:
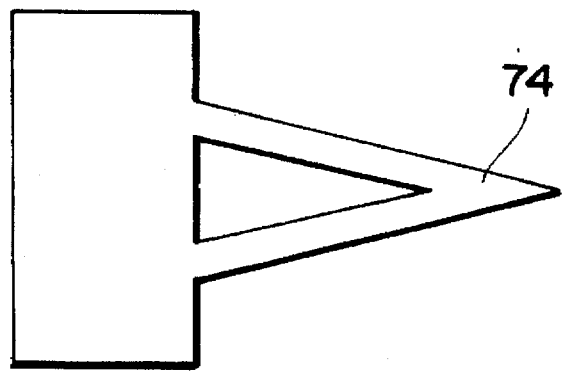
FIG. 30 is a plan view of the cantilever intermediate shown in FIG. 29.
Figure 31:
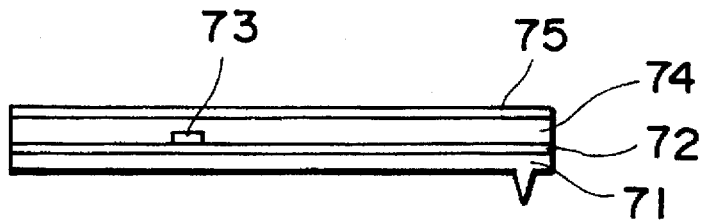
FIG. 31 is a cross sectional view of a cantilever product to illustrate a step for fabricating the cantilever.
Figure 32:
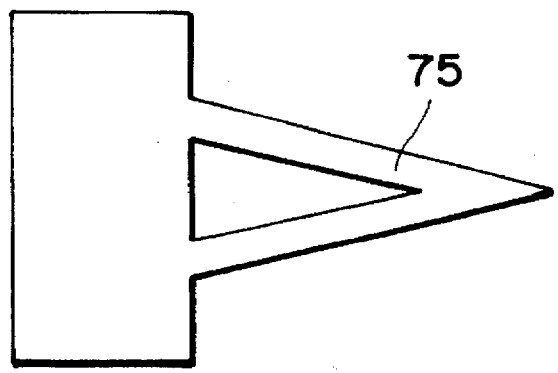
FIG. 32 is a plan view of the cantilever product shown in FIG. 31.

Next described is another embodiment of the cantilever used in atomic force microscopes according to the present invention. A cantilever and a method for producing it are described referring to FIG. 13 thru FIG. 27. FIG. 13 is a side view of a cantilever intermediate and FIG. 14 a plan view of the cantilever intermediate. A silicon nitride layer 71 is first formed on silicon substrate 70 in the thickness of about 0.3 micron by the CVD process. Then, as shown by a side view of a cantilever intermediate in FIG. 15 and a plan view of the cantilever intermediate in FIG. 16, a local area 71a on the silicon nitride layer 71 is removed by the reactive dry etching to form a pore. Further, as shown by a side view of a cantilever intermediate in FIG. 17 and a plan view of the cantilever intermediate in FIG. 18, a stylus (portion to become a needle-shaped tip) is formed by the anisotropic etching using potassium hydroxide. Next, as shown by a side view of a cantilever intermediate in FIG. 19 and a plan view of the cantilever intermediate in FIG. 20, silicon nitride is further deposited over the silicon nitride layer 71 by the CVD process to increase the thickness of silicon nitride layer 71 to 0.5 micron. Then, as shown by a side view of a cantilever intermediate in FIG. 21 and a plan view of the cantilever intermediate in FIG. 22, an aluminum oxide layer 72 is formed in 0.3 micron on the silicon nitride layer 71. Subsequently, as shown by a side view of a cantilever intermediate in FIG. 23 and a plan view of the cantilever intermediate in FIG. 24, a pattern for platinum electrode 73, which is to become a lower electrode, is formed by the ordinary photolithography technology and sputtering method. Further, as shown by a side view of a cantilever intermediate in FIG. 25 and a plan view of the cantilever intermediate in FIG. 26, a photoresist pattern is formed by the photolithography technology, and some of the silicon nitride layer 71 and aluminum oxide layer 72 are removed by the reactive dry etching in regions except for a cantilever body 72a and a probe portion 72b to become a probe. Next, as shown by a side view of a cantilever intermediate in FIG. 27 and a plan view of the cantilever intermediate in FIG. 28, the silicon substrate 70 is removed by the anisotropic etching with an etchant of ethylenediamine pyrocatechol aqueous solution type. Then, as shown by a side view of a cantilever intermediate in FIG. 29 and a plan view of the cantilever intermediate in FIG. 30, PZT layer 74 is formed in the thickness of 1.0 micron on the aluminum oxide layer 72 by the sputtering technique. A platinum electrode 75 is then formed as an upper electrode on the PZT layer 74, as shown in FIGS. 31 and 32.

Figure 33:
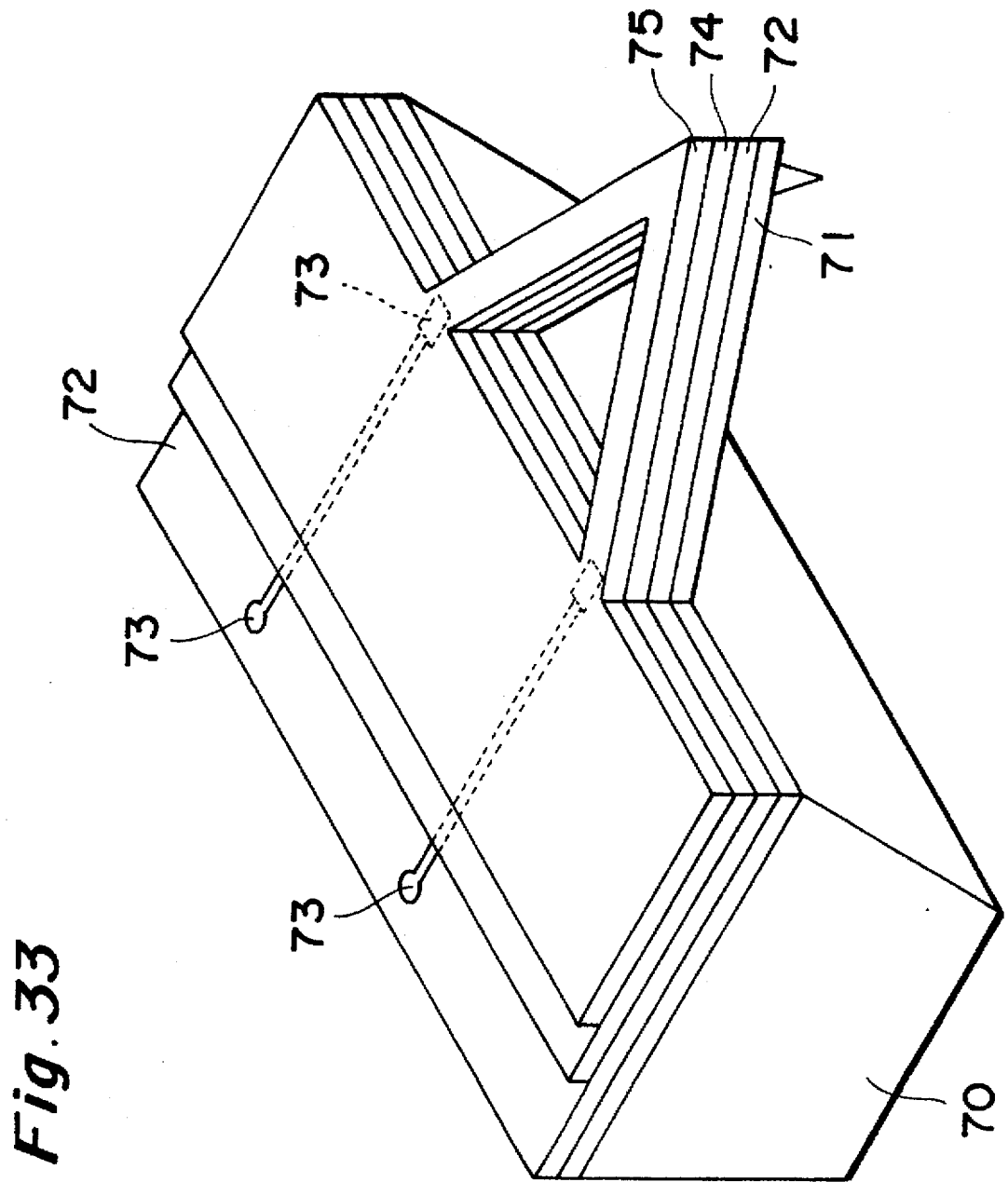
FIG. 33 is a perspective view of the cantilever shown in FIG. 32.

FIG. 33 is a perspective view of the cantilever as produced by the above steps. As shown, the aluminum oxide layer 72 is interposed between the silicon nitride layer 71 and the PZT layer 74 as being a lead-based ferroelectric material, which prevents the silicon nitride layer 71 from reacting with PZT layer 74. The aluminum oxide layer 72 may be replaced with any oxide layer having a very low reactivity with the lead ferroelectric material, for example, a magnesium oxide layer, a magnesium aluminate layer, or a chromium oxide layer. Also, the silicon nitride layer 71 may be replaced or combined with a silicon dioxide layer, a silicate glass, or a metal.

Figure 34:
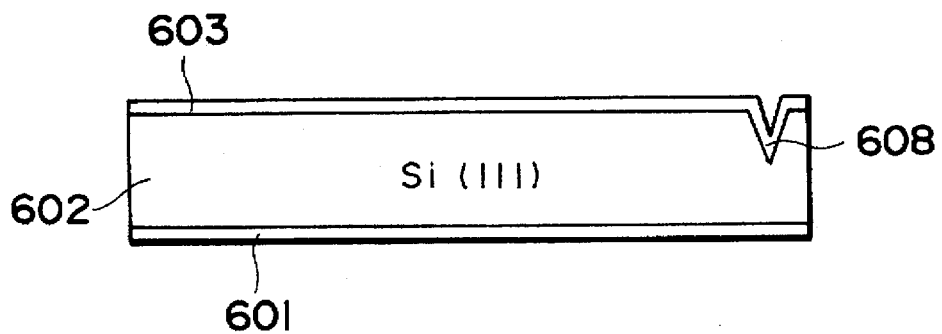
FIG. 34 is a cross sectional view of a cantilever intermediate to illustrate a step for fabricating a cantilever.
Figure 35:
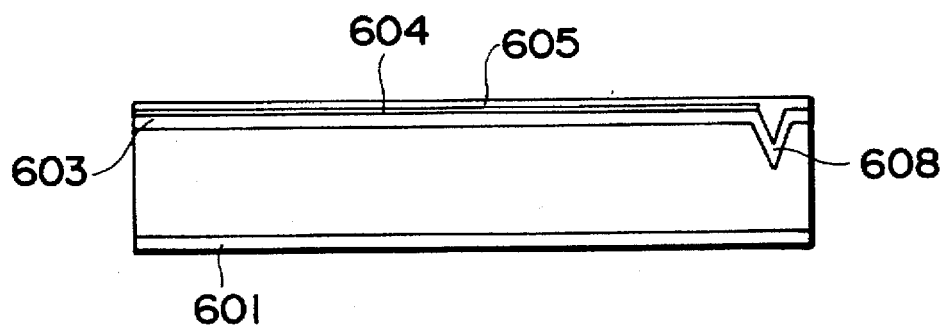
FIG. 35 is a cross sectional view to illustrate a step for fabricating the cantilever.
Figure 36:
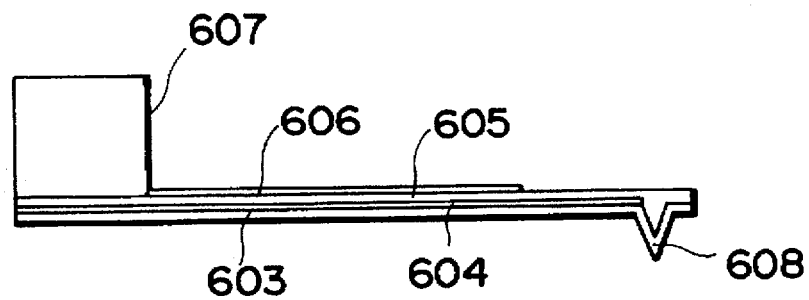
FIG. 36 is a cross sectional view to illustrate a cantilever and a step for fabricating the cantilever.

Next described is another embodiment of the cantilever according to the present invention. FIG. 34 thru FIG. 36 are side views of another cantilever. In this embodiment the cantilever is fabricated using lead titanate zirconate as a piezoelectric crystal. Silicon nitride layers 601, 603 are formed on two surfaces of (111) silicon substrate 602. Then a pit is formed in a predetermined region on the silicon nitride layer 603 by the reactive dry etching and the anisotropic etching with potassium hydroxide. The silicon substrate 602 is oxidized in the pit to form a probe 608 of silicon dioxide. This oxidation is continued before the silicon nitride layer of 200 nm reduces the thickness to 50 nm. A lower platinum electrode 604 is then formed in the thickness of 50 nm on the silicon nitride layer 603 by the photolithography technology. The platinum electrode 604 is <111>-oriented according to the plane direction of silicon substrate 602. PZT layer 605 is further formed by the sputtering, while the PZT layer 605 is also <111>-oriented according to the plane direction of platinum electrode 604. The crystal system of PZT layer 605 forming a thin film includes only the rhombohedral system. Then a platinum electrode 606 to become an upper electrode is formed on PZT layer 605 by the vapor deposition method. The silicon nitride layer 601 on the back surface of silicon substrate 602 is removed by the reactive dry etching and the silicon substrate 602 is also removed by the anisotropic etching with potassium hydroxide. Finally, a glass block 607 for fixing the cantilever is electrostatically adhered onto PZT layer 605.

The size of the cantilever is about 100 microns in length, about 20 microns in width, and about 2 microns in thickness. The size of PZT layer 605 as a piezoelectric thin film is 100 microns in length, 20 microns in width, and 1 micron in thickness.

To evaluate the life of this cantilever, the PZT layer 605 was operated as an actuator. An ac voltage of 10 kHz and 10 V was applied between platinum electrodes 604 and 606. A displacement of 1 micron of lever tip 608 was observed using an optical lever. This displacement amount is a relatively large strain for ferroelectric materials. This cantilever was kept in the displacement amount while the ac voltage was applied for a long time between platinum electrodes 604 and 606. The cantilever using the oriented PZT showed no change in displacement amount of lever tip 608 after application of the voltage for ten hours. As a comparative example, a cantilever was produced only of silicon oxide, and a non-oriented PZT layer was formed thereon in the same shape as that in FIG. 36. Then the same life evaluation test was conducted after a polarization treatment of the PZT layer. After ten hours, a displacement amount of lever tip decreased to about one third of an initial displacement. This must be because the effect of polarization treatment was lost.

Figure 37:
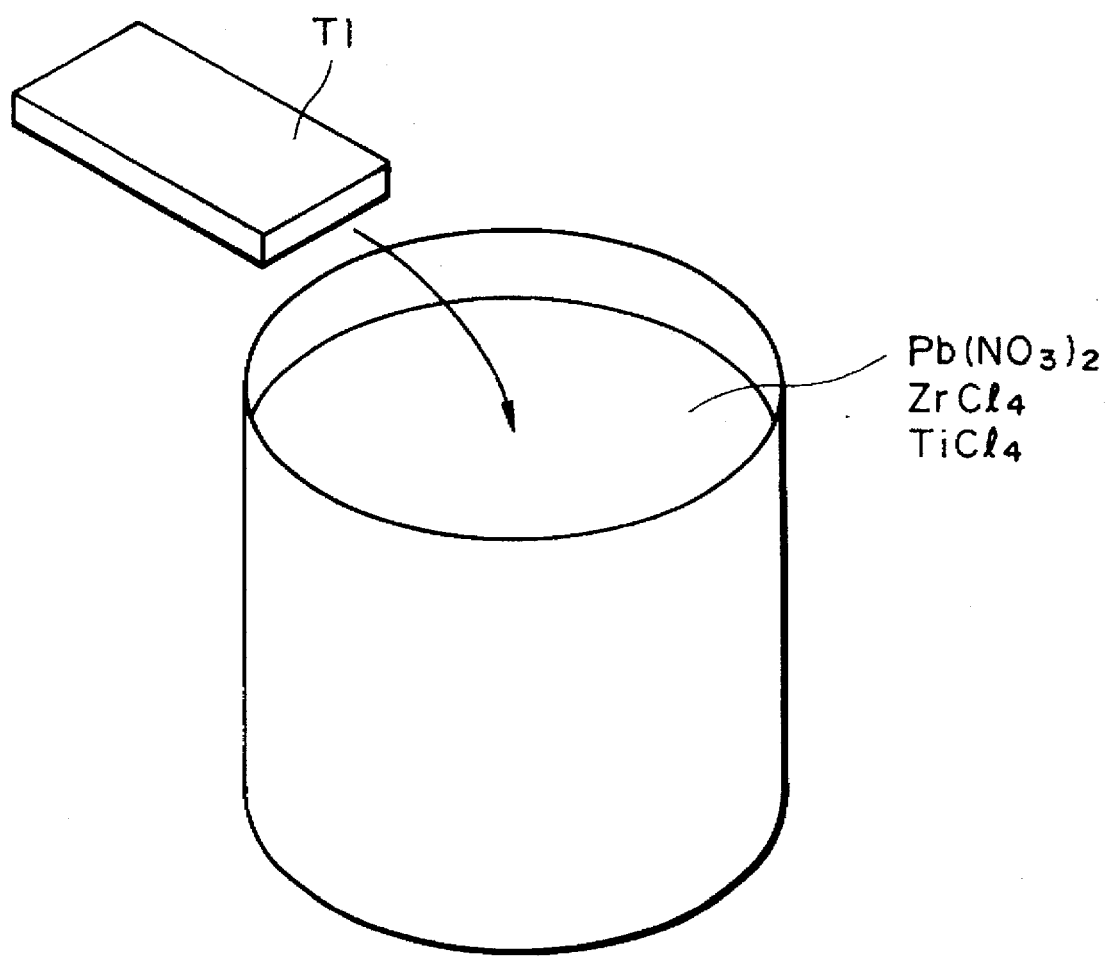
FIG. 37 is an explanatory drawing to illustrate the hydrothermal synthesis reaction with titanium foil.

The cantilever can be fabricated by using another method. As shown in FIG. 37, a titanium foil T1 of length 1.5 mm, width 100 µm, and thickness 10 µm is immersed in a solution mixture of $Pb(NO_3)_2$, $ZrCl_4$, and $TiCl_4$ as adjusted in the composition of phase boundary and a 5N KOH aqueous solution is added to the mixture, effecting a hydrothermal synthesis reaction at 120° C. and for 200 hours. As a result, PZT layers are produced in about 10 µm on the both sides of the titanium foil T1. PZT takes the cubic system, which is principally <001>-oriented under the film-forming conditions. Platinum electrodes are formed on the both PZT layers by the vapor deposition method and the resultant is fixed at about one third of the foil length in the form of a cantilever while giving wiring.

It was operated as an actuator and evaluated in respect of reliability, in the same manner as the cantilever shown in FIG. 36. Since it was found from performance characteristics at low frequency that the polarization direction was directed toward the titanium electrode, an ac voltage of 10 V and 1 kHz was applied between the two external electrodes, observing the amplitude of about 10 µm by an optical lever. There was no change of the amplitude observed even after the continuous operation of 50 hours.

Another embodiment of the cantilever is next described.

Figure 38:
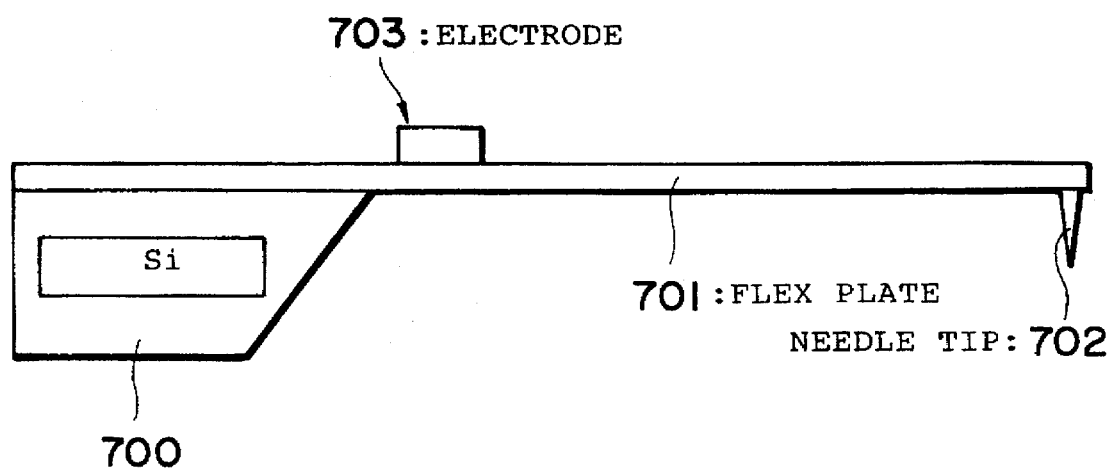
FIG. 38 is a cross sectional view of a cantilever in an embodiment.

A flexible plate PL is made of silicon dioxide 700 with an intermediate layer of a thin-film displacement sensor of lead titanate zirconate in the arrangement shown in FIG. 38 by the following production method.

The cantilever of silicon dioxide 701 was produced by the conventional method using the micromachining and anisotropic etching of Si.

Production of thin-film displacement sensor

Figure 39:
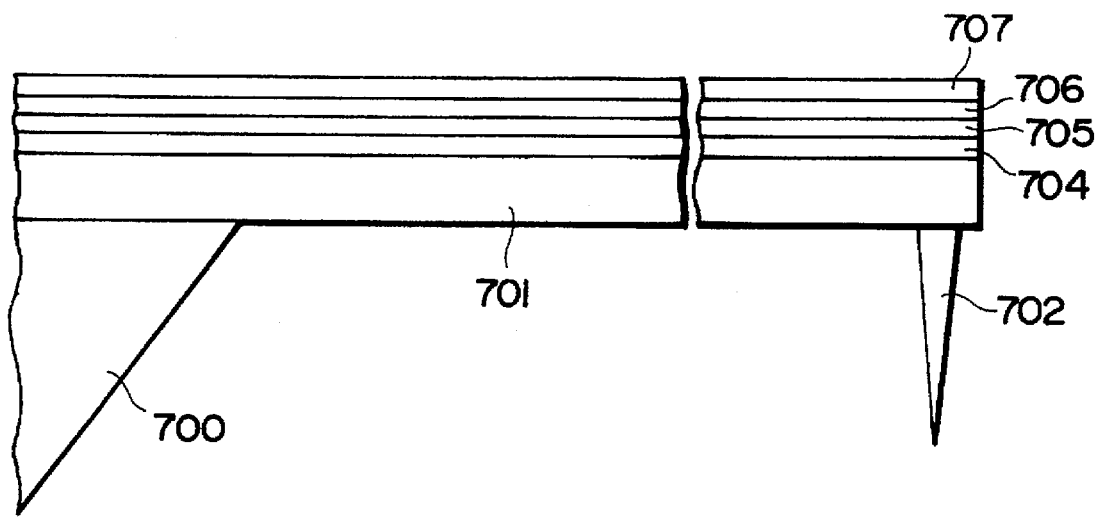
FIG. 39 is a cross sectional view of the cantilever to illustrate a step for fabricating the cantilever shown in FIG. 38.

A tantalum buffer layer 704 is first formed on the above cantilever provided with the plate of $SiO_2$, shown in FIG. 39. The tantalum buffer layer 704 is formed in about 50 Å by the sputtering technique with a target of tantalum metal at ordinary temperature under the pressure of $2\times10^{-3}$ Torr of Ar-oxygen mixture gas (9:1) in a vacuum chamber. Under the same conditions a platinum electrode layer 705 is further formed in about 500 Å with a target of platinum. Then, an intermediate piezo-electric layer 706 is formed in 1 µm on the platinum electrode 705 by the sputtering method with a target of a sintered body of lead titanate zirconate under the pressure of below $10^{-4}$ Torr of oxygen gas in vacuum chamber. Finally, a gold thin film 707 to become an upper electrode is formed by the vapor deposition method under the oxygen gas pressure of below $10^{-5}$ Torr.

Figure 40:
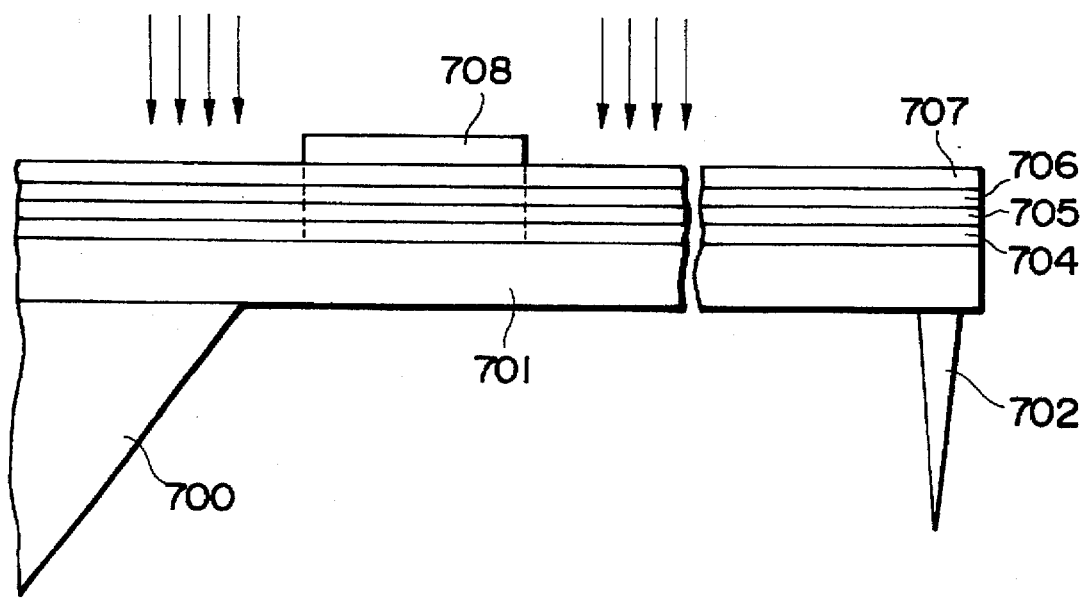
FIG. 40 is a cross sectional view of the cantilever to illustrate a step for fabricating the cantilever shown in FIG. 38.

After that, a photoresist layer 708 is formed over the gold thin film 707 and the photoresist layer 708 is removed excluding the sensor-forming portion by exposure and development by an exposure apparatus. Subsequently, etching with argon gas is carried out under the conditions of acceleration voltage 500 V, incident angle 0°, and ion current density 1 $mA/cm^2$, removing the upper and lower electrodes and the intermediate piezoelectric layer (see FIG. 40). Finally, the remaining resist layer is removed to obtain a cantilever equipped with a thin-film displacement sensor as shown in FIG. 38. Lead wires are made of a metal, for example, aluminum by ordinary process, though not shown in FIG. 38.

The size of the cantilever is 100 µm in length $l_1$, 20 µm in width ($w_1$), and 2 µm in thickness ($t_1$). The size of the piezoelectric thin film is 10 µm in length ($l_2$), 20 µm in width ($w_2$), and 1 µm in thickness ($t_2$). Letting d be a displacement of probe tip (1 nm), the stress ($\sigma$) occurring in the ferroelectric thin film 706 is approximately as follows:

$$\sigma = \frac{d \cdot 3E \cdot t_1/2}{l_1^2}.$$

For the stress, polarization charges as defined by the following formula are produced in the ferroelectric film 706.

$$D = d_{31} \cdot \sigma$$

In the formulas, E is the Young's modulus of silicon dioxide film-formed on silicon, and $d_{31}$ a piezoelectric constant of lead titanate zirconate in the horizontal vibration direction as represented by 31. The polarization charges change depending upon the material constants of E and $d_{31}$, but a potential difference of about 1 mV is produced between the two electrodes for ferroelectric thin film 706. A displacement amount of the cantilever can be obtained by effecting the ordinary signal processing used for sonar or the like for acoustic diagnosis, on the induced voltage.

As shown in FIG. 38, the thin-film displacement sensor of the present invention has the very simple structure, in which the sensor portion itself needs not constitute the cantilever or a part of the cantilever. Therefore, the displacement sensor can be used as a displacement sensor mounted not only on the flexible plate of silicon oxide thin film as shown in the present embodiment, but also on a flexible plate made of another material selected from various materials.

Figure 41:
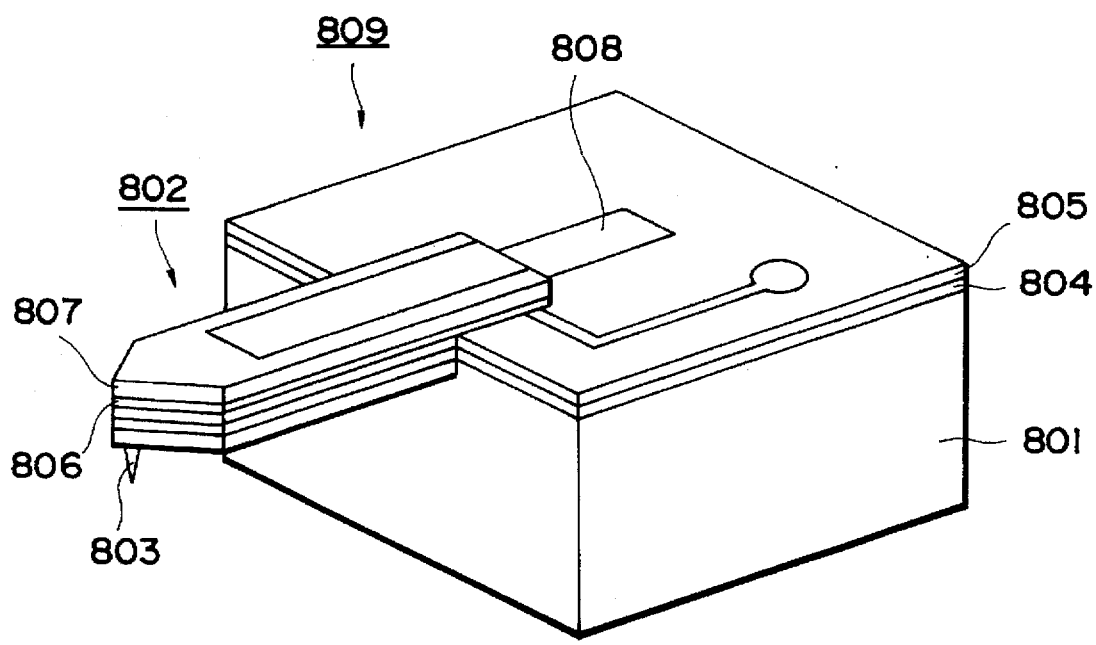
FIG. 41 is a perspective view of a cantilever.

Next, FIG. 41 shows the basic structure of an AFM cantilever with a probe, in which a piezoelectric thin film for drive is formed, based on the present invention. The production method is pursuant to the method as disclosed in Japanese Patent Application No. 5-180532. In detail, a silicon nitride layer 804 is formed on a silicon substrate 801 by the CVD method, and the silicon nitride layer 804 is removed in a portion corresponding to a probe 803 by the reactive dry etching. An etched pit to become a probe is formed by the anisotropic etching with potassium hydroxide on the silicon substrate 801. Silicon nitride is further deposited on the silicon nitride layer 804 by the CVD method. Subsequently, a magnesium oxide layer 805 to become a buffer layer is formed on the silicon nitride layer 804 by the sputtering method. Then a pattern of lower platinum electrode 806 is formed on MgO film 805 by the ordinary photolithography and sputtering methods. Further, a photoresist pattern is formed by the photolithography, and the magnesium oxide 805 and silicon nitride layer 804 are removed except for portions to become cantilever body 802 and cantilever base 809 by the reactive dry etching. Then the cantilever body 802 is formed by the anisotropic etching. After that, PZT layer 807 is formed on the lower platinum electrode 806 by the sputtering method. An upper platinum electrode 808 is finally produced by mask vapor deposition. It is to be desired that the polarization treatment is effected on the PZT layer 807, using the upper electrode 808 and lower electrode 806 in order to effectively draw out the piezoelectric effect.

Applying the conventional silicon processes as described, the AFM cantilever of the present invention can be attained with a sharp probe and an appropriate spring constant equivalent to those of the conventional cantilevers. Also, since the structure of PZT layer 807 and electrodes 806, 808 is simple, a load on the processes is almost equal to that for the conventional cantilevers. Also, mounting the piezoelectric film 807 on the cantilever, the cantilever itself can be independently driven, whereby it can have basically the same function as the quartz oscillator probe.

Figure 42:
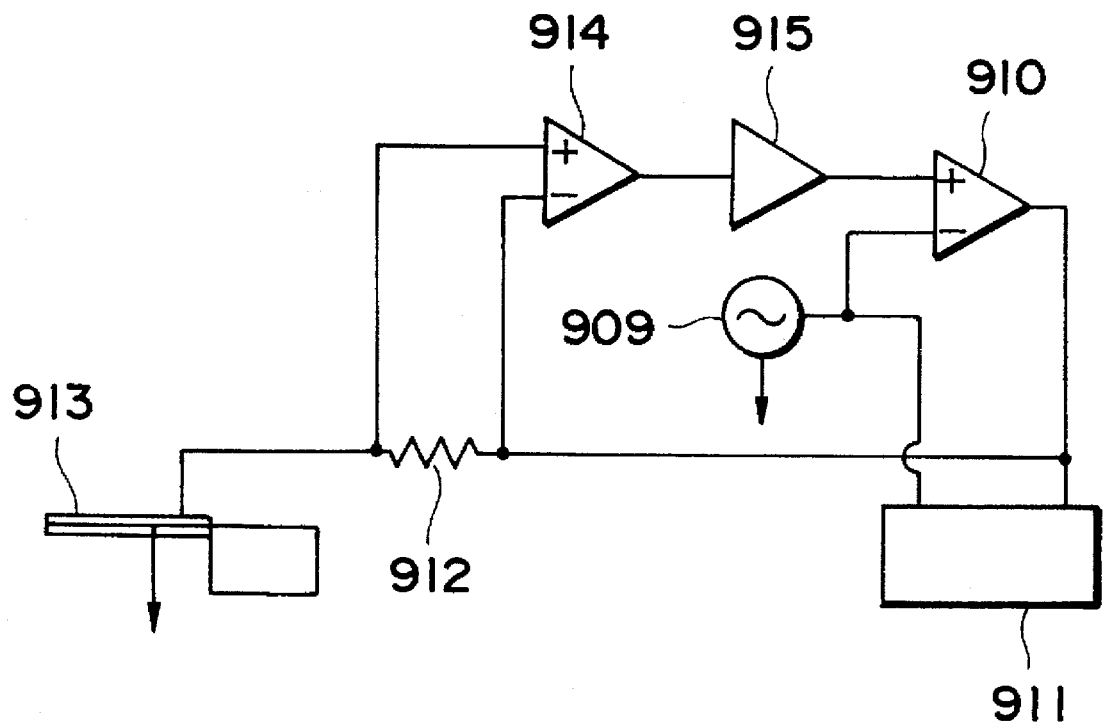
FIG. 42 is a drawing to show a cantilever and a circuit for vibrating the cantilever and processing a signal from the cantilever.
Figure 43:
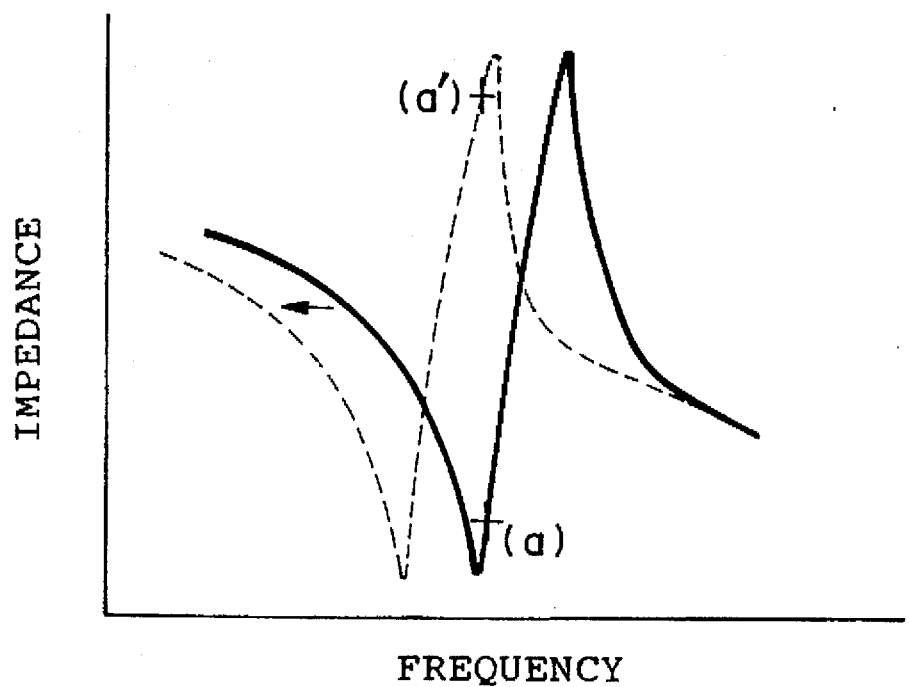
FIG. 43 is a graph to show resonance characteristics of impedance of a piezoelectric thin film.

FIG. 42 shows an embodiment of a surface configuration measuring apparatus using the AFM cantilever with a piezoelectric thin film based on the present invention, in which the piezoelectric thin film is included in a feedback circuit. An oscillator 909 supplies an ac drive signal near the resonance frequency of AFM cantilever 913 to a piezoelectric thin film 807 on the cantilever. The impedance of piezoelectric thin film 807 largely changes near the resonance frequency, as shown in FIG. 43. For example, suppose the cantilever is driven at the frequency indicated by (a) in FIG. 43. An electric current flowing in piezoelectric thin film 807 is measured as follows. A high-resistance differential amplifier 914 detects it as a voltage through a detection resistor 912. A phase compensating circuit 915 matches the phase of the signal with the drive signal, and a gain-variable amplifier 910 adjusts the gain. A lock-in-amplifier 911 performs phase detection so as to measure the current. The detection sensitivity can be further improved by setting the Q value of the total system composed of the AFM cantilever and the electric circuit to a value higher than the Q value of the cantilever alone, while adjusting the amplification rate and the phase of the positive feedback circuit.

If a force acts between the probe of the resonating AFM cantilever and a detected object, the resonance frequency is shifted to the lower frequency range, as shown by the arrow in FIG. 43. On this occasion, the impedance of piezoelectric thin film 807 changes from (a) to (a') in the drawing, so that a change of the interatomic force, i.e., the configuration of the surface of detected object, can be known by detecting an amount of the change through the lock-in-amplifier 911. Further, similarly as the feedback mode of conventional AFM, it is possible that while keeping the attraction scanning state by feedback control to an AFM scanning system so as to maintain the impedance constant, the configuration of sample surface can be measured with very little damage on the detected object.

Figure 44:
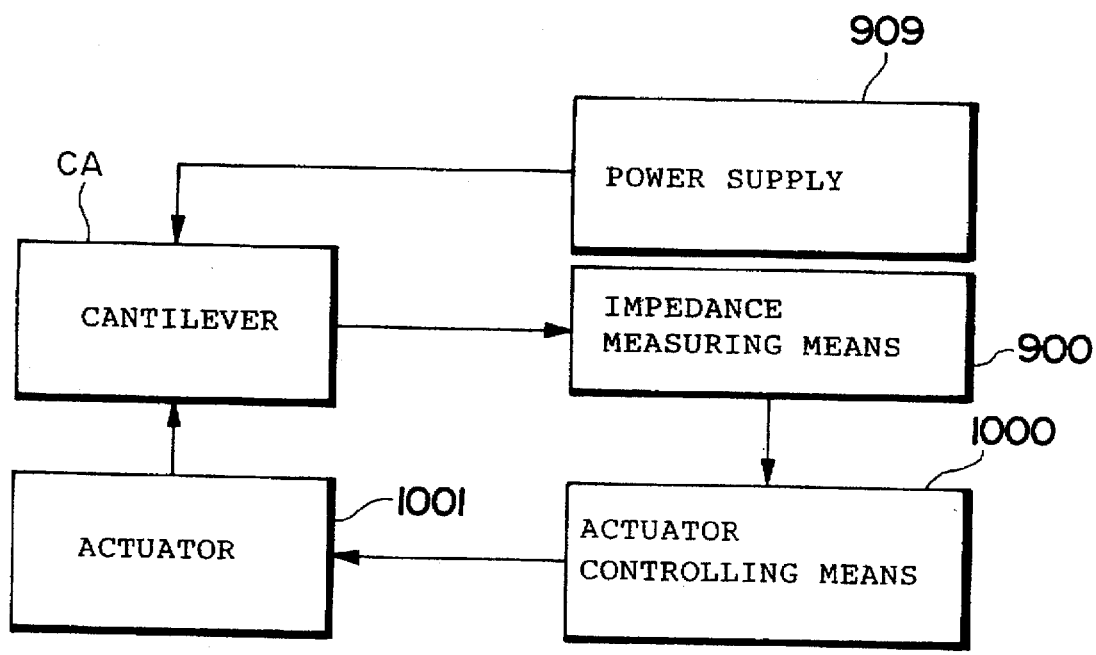
FIG. 44 is a block diagram of a atomic force microscope according to present embodiment.

FIG. 44 is a block diagram of the atomic force microscopy shown in FIG. 41 and FIG. 42. As shown in FIG. 44 the AFM comprises impedance measuring means 900 for measuring an impedance of the first layer 807, power supply 909, actuator controlling means 1000, and actuator 1001. The self vibrator constructed of the electrodes 808, 806 and first piezoelectric layer 807 shares the first layer 807, the first electrode 808 and the second electrode 807 with the self strain detector. The power supply 909 applies an ac voltage between the first electrode 808 and the second electrode 806. The frequency of the ac voltage is close to a resonance frequency of the cantilever CA to such an extent that the impedance of the first layer 807 changes when the cantilever CA shown in FIG. 41 receives a atomic force.

The impedance measuring means 900 is connected between the first electrode 808 and the second electrode 807 to detect the impedance between the first electrode 808 and the second electrode 807.

The actuator 1001 is electrically connected to the impedance measuring means 900, for moving the measured sample in a direction in which the cantilever CA is displaced with application of the ac voltage. The actuator controlling means 1000 controls the actuator 1001 so that the impedance measured by the impedance measuring means 900 is kept constant, so as to move the measured sample. In this case, the first layer CA constitutes a part of a feedback circuit.

Figure 45:
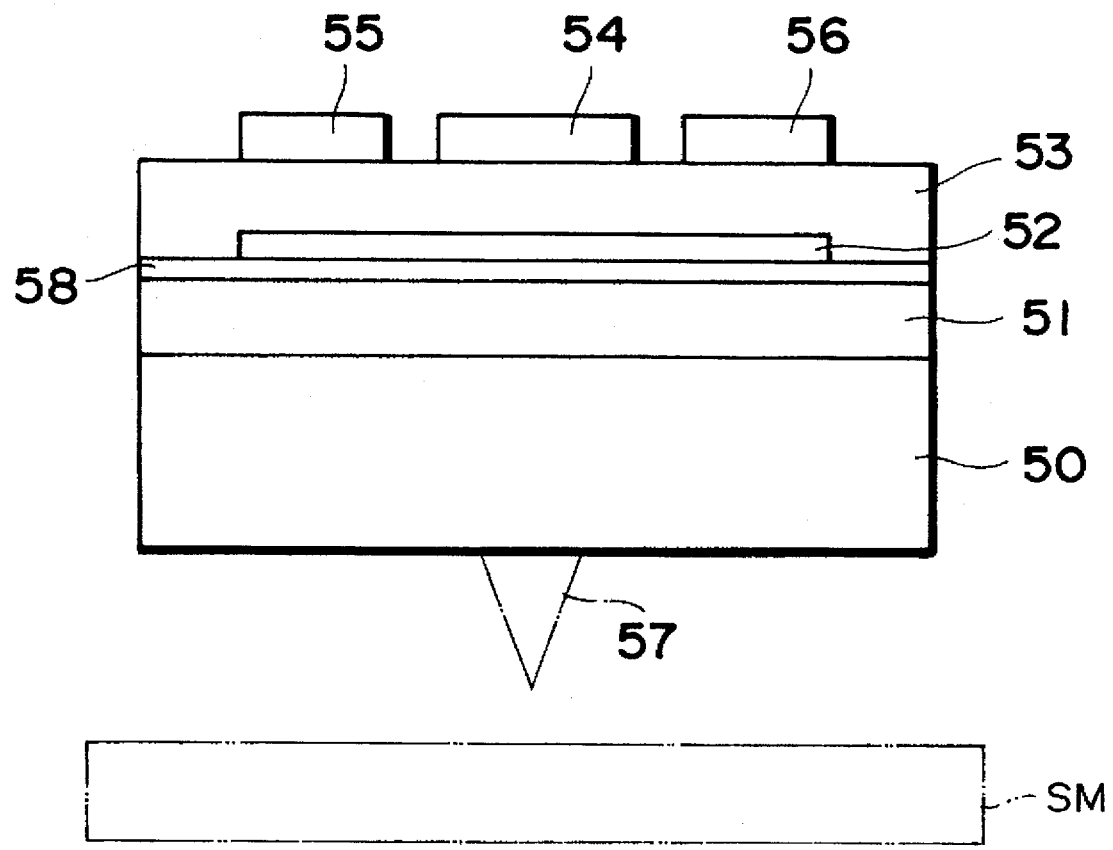
FIG. 45 is a cross sectional view of a cantilever drawn by the same method of expression as FIG. 6.
Figure 46:
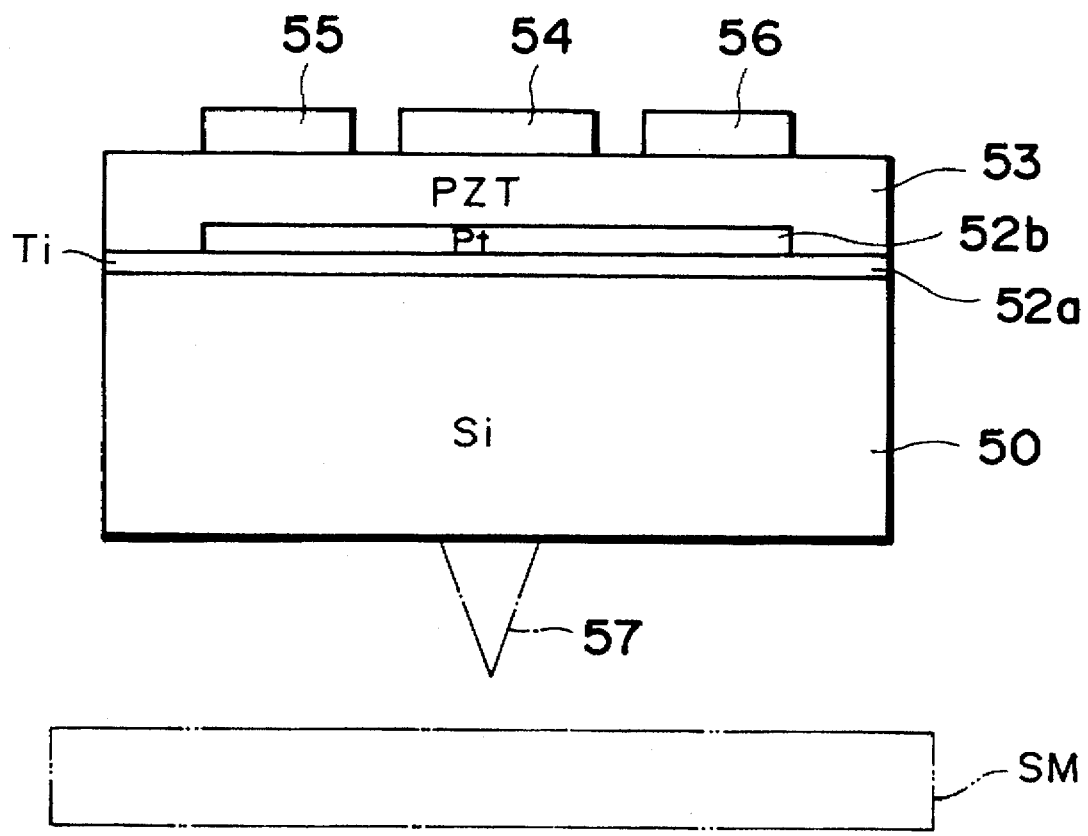
FIG. 46 is a cross sectional view of a cantilever drawn by the same method of expression as FIG. 6.

From the invention thus described, it will be obvious that the invention may be varied in many ways. FIG. 45 is a cross sectional view of a cantilever drawn by the same method of expression as FIG. 6. Silicon nitride layer 51 is formed on a silicon substrate or layer 50, and MgO insulator layer 58 is formed on the silicon nitride layer 51. Platinum first electrode 52 is formed on the insulator layer 58, piezoelectric layer (PZT layer) 53 is formed on the first electrode 52, and three electrodes 54, 55, 56 are arranged on the piezoelectric layer 53, as shown in FIG. 45. The pointed portion probe of silicon dioxide 57 is formed on the silicon substrate 50. In this embodiment shown in FIG. 45, the insulator layer 58 serves as the buffer layer. When the platinum electrode 52 is deposited on the silicon substrate 50, an adhesion between the electrode 52 and silicon substrate 50 is not sufficient. FIG. 46 is a cross sectional view of a cantilever drawn by the same method of expression as FIG. 6, and the cantilever improves the adhesion between electrode 52a and silicon substrate 50. As shown in this figure, electrode 52a, 52b is formed on the silicon substrate 50, and piezoelectric layer (PZT layer containing lead) 53 is disposed between the electrode 52a, 52b and electrodes 54, 55, 56. The pointed potion 57 is formed on the silicon substrate 50. The electrode 52a, 52b comprises a titanium layer 52a and platinum layer 52b.

The titanium layer 52a functions as barrier metal for restricting the diffusion of silicon atoms from the silicon layer or substrate 50 into the first layer 53. The adhesion between the titanium layer 52a and the silicon layer 50 is higher than that between the silicon layer 50 and the platinum layer 52b. If the titanium layer 52a is interposed between the platinum layer 52b and the silicon substrate 50, the platinum layer 52b and the silicon substrate 50 become resistant to peeling-off. Further, the thickness of the platinum layer 52a is preferably not less than 20 nanometers for growth of the first piezoelectric layer (PZT layer) 53. The thickness of the platinum layer 52a is preferably not less than 200 nanometers for stress relaxation between the first layer 53 and the silicon substrate 50.

Figure 47:
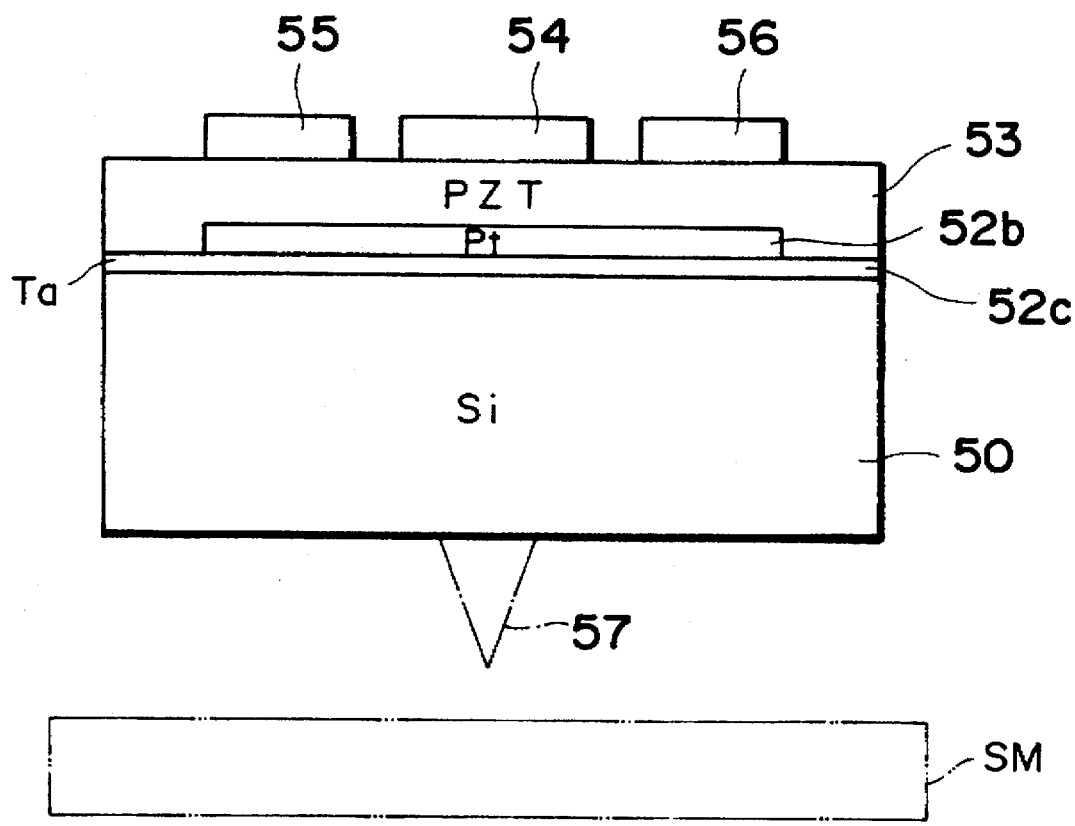
FIG. 47 is a cross sectional view of a cantilever drawn by the same method of expression as FIG. 6.

Also, the electrode may comprise a platinum layer and a tantalum layer. FIG. 47 is a cross sectional view of a cantilever drawn by the same method of expression as FIG. 46. As shown in this figure, electrode 52c, 52b is formed on the silicon substrate 50, and piezoelectric layer (PZT layer) 53 is disposed between the electrode 52c, 52b and electrodes 54, 55, 56. The pointed potion 57 is formed on the silicon substrate 50. The electrode 52c, 52b comprises a tantalum layer 52c and platinum layer 52b. The tantalum layer 52c is formed on the platinum layer 52b so that the platinum layer 52b is disposed between the first piezoelectric layer 53 and the tantalum layer 52c. The tantalum layer has the same function as the titanium layer, i.e., the adhesion between the tantalum layer 52c and silicon layer is improved. Since the tantalum layer 52c is unlikely to form silicide, the use of tantalum layer 52c is effective. The thickness of the tantalum layer 52c or the titanium layer 52b shown in FIG. 46 is preferably not less than 10 nanometers taking the adhesion into account. Taking the diffusion of silicon into consideration, the thickness is preferably not less than 100 nanometers.

Figure 48:
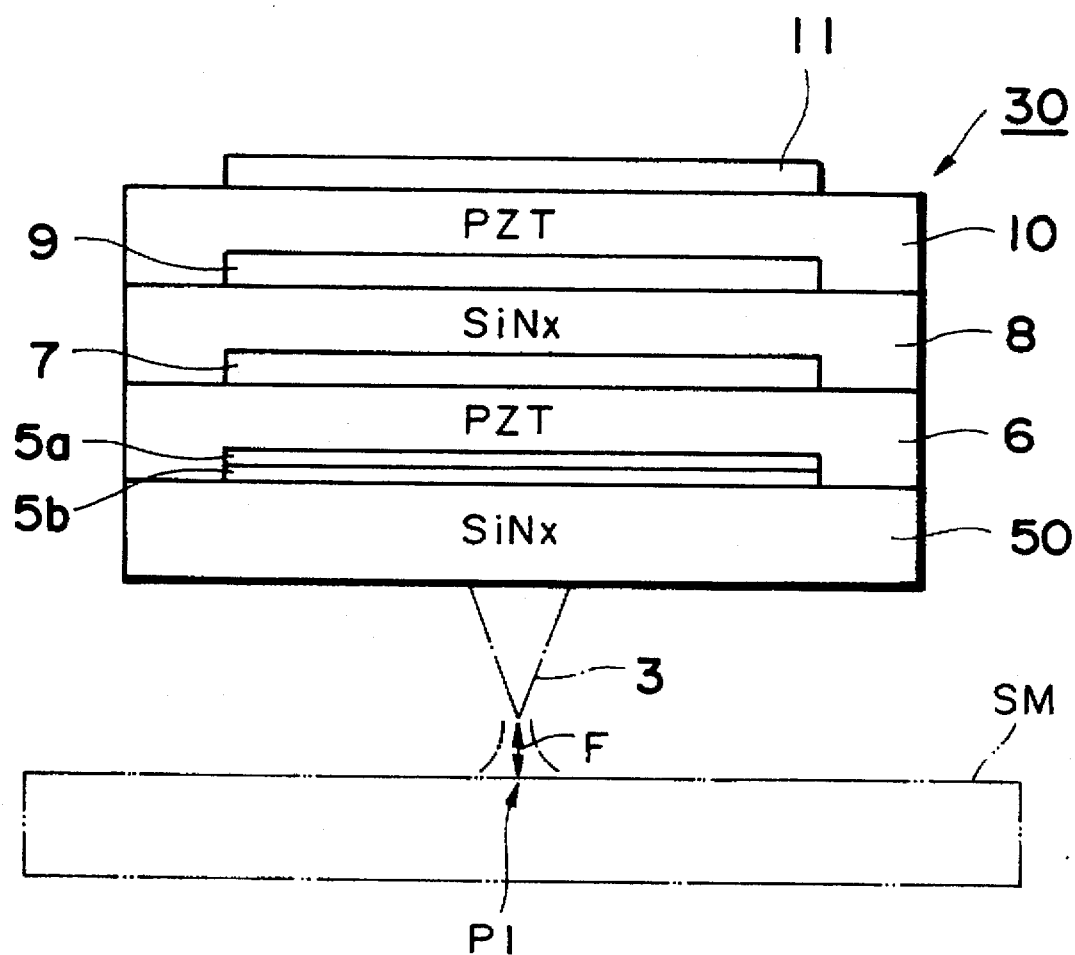
FIG. 48 is a cross sectional view of a cantilever drawn by the same method of expression as FIG. 6.

Further, the titanium or tantalum layer is also adapted to the cantilever shown in FIG. 6. FIG. 48 is a cross sectional view of a cantilever drawn by the same method of expression as FIG. 6. As shown in FIG. 48, the electrode 5a, 5b comprises a platinum layer 5a and titanium or tantalum layer 5b. The electrode 5a, 5b is formed on a silicon substrate 50, and the piezoelectric layer (PZT layer) 6, electrode 7, silicon nitride layer 8, electrode 9, piezoelectric layer 10 and electrode 11 are formed as shown in the figure. The titanium or tantalum layer 5b is in contact with the silicon substrate 50 and improves the adhesion and characteristics of the cantilever.

In the first place, an AFM equipped with an optical microscope will be explained with reference to FIG. 1A. In the following explanation, the same elements are referred to with the same marks, while omitting their overlapping explanations.

FIG. 1A is a side view of this microscope. One of the points by which this microscope is distinguished from the conventional optical microscope lies in a portion A in FIG. 1A.

Within a tube 1000, prisms 1001 and 1002 are disposed as shown in FIG. 1A. To a lower part of the tube 1000, a revolver 1004 which rotates around the axis of the tube 1000 is attached. Objective lenses 1005, 1006, and 1007 are fixed to the revolver 1004. As shown in FIG. 1C, the objective lens 1007 is placed within a tubular piezoelectric actuator 1008.

The optical axis of the objective lens 1007 is perpendicular to a stage 1009 and also perpendicular to the lower surface of the prism 1002. Accordingly, an image including the surface of a sample SM and a cantilever CA can be observed through the objective lens 1007, the prisms 1002 and 1001, and an eyepiece 1003.

The XY stage 1009 can be moved within a plane parallel to the surface thereof when a slide mechanism 1010 disposed therebelow is moved. Also, the slide mechanism 1010 is fixed to a lower slide mechanism 1011 which is slidable in upward and downward directions. As a result, the stage is moved within a three-dimensional space as these mechanisms are driven.

Figure 1B:
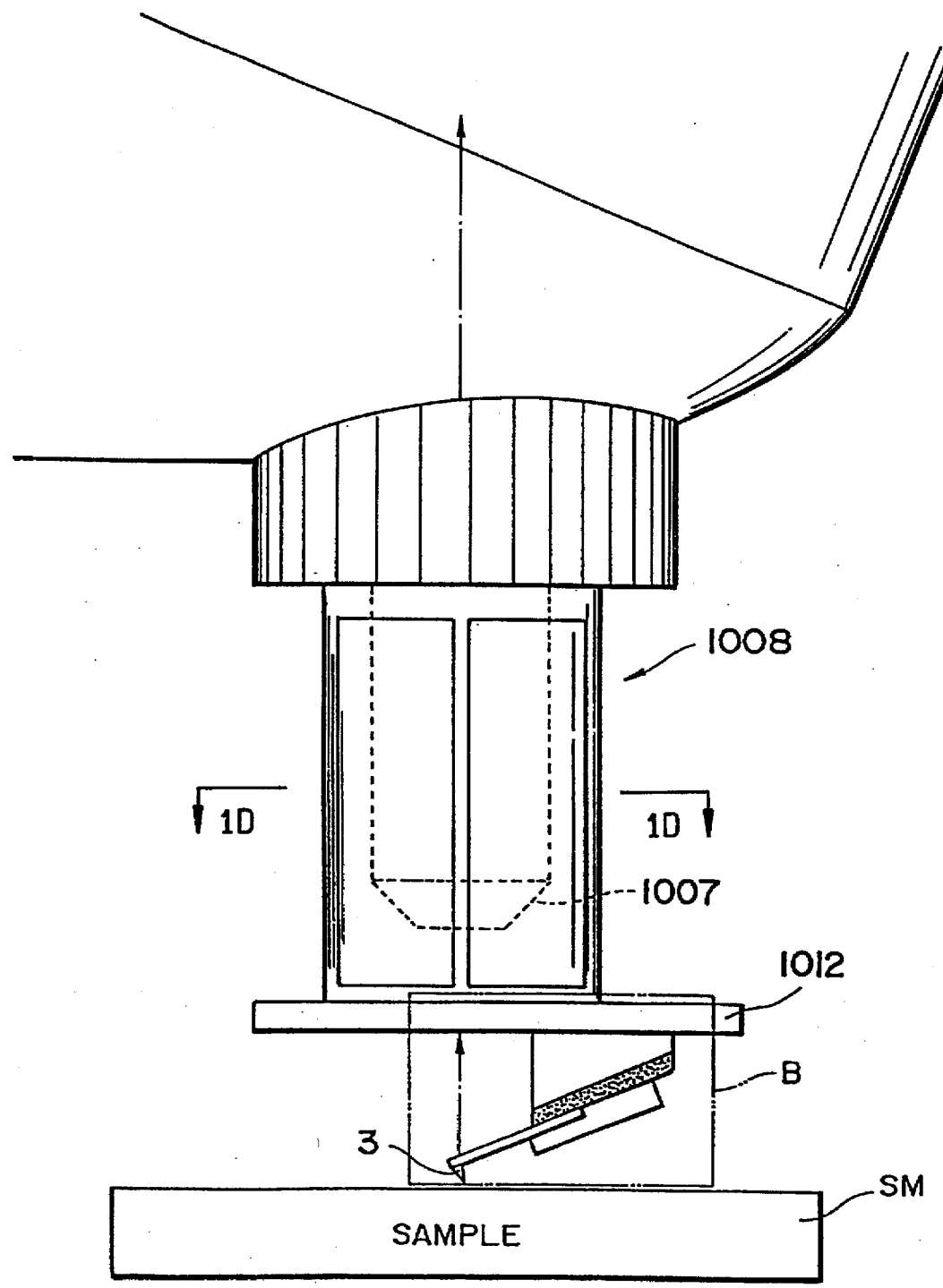
FIG. 1B is an enlarged view of a portion A in FIG. 1A.
Figure 1C:
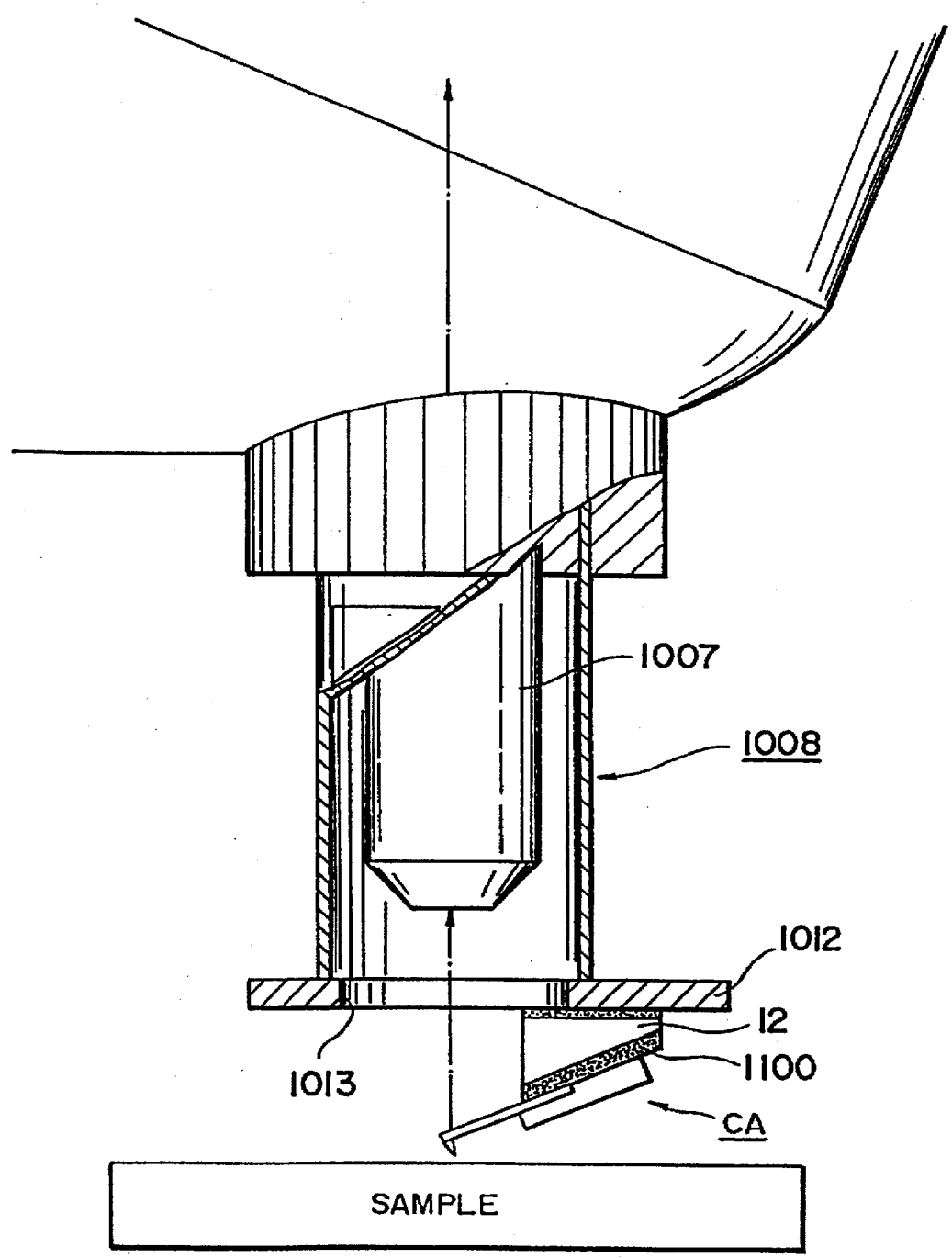
FIG. 1C is a partially-broken view of FIG. 1B.

FIG. 1B is an enlarged view of the portion A. To a lower portion of the tubular actuator 1008, a supporting plate 1012 is fixed. Also, the objective lens 1007 is placed within the actuator 1008. Here, the optical axis of the objective lens 1007 coincides with that of the tubular actuator 1008.

As shown in FIG. 1C, the supporting plate 1012 has a hole 1013 at the center thereof. To the lower surface of the supporting plate 1012, one of the cantilevers CA explained in the foregoing is fixed by way of an adhesive 1100. In this embodiment, the glass block 12 is fixed to the layer 10.

Figure 1D:
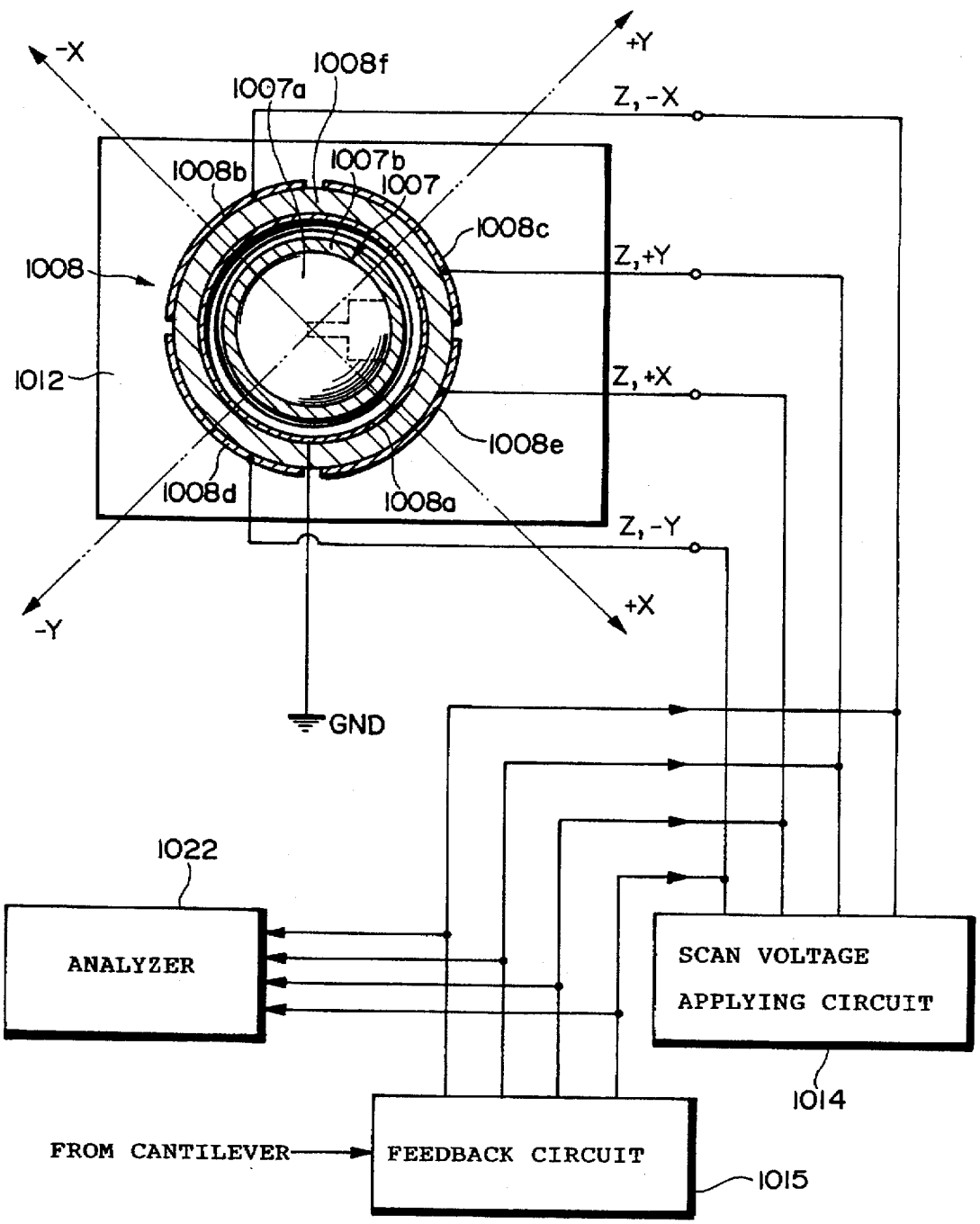
FIG. 1D is a cross-sectional view of the actuator taken along the line 10—10 of FIG. 1B.

FIG. 1D is a cross-sectional view of the actuator taken along the line 10—10 of FIG. 1B. The tubular actuator 1008 comprises a piezoelectric crystal tube 1008f, an electrode 1008a covering the inner surface thereof, and 4 electrodes 1008b to 1008e fixed to the outer surface thereof. The inner electrode 1008a is connected to ground. When an appropriate voltage is applied between these electrodes, the tubular actuator 1008 moves in upward and downward or leftward and rightward or forward and backward directions. For example, when a voltage higher than ground is applied to all the outer electrodes 1008b to 1008e, the tubular actuator 1008 moves (deforms) in its axial direction (referred to as "Z direction" in the following). Also, when a voltage higher than ground is applied to one of the outer electrodes, e.g., 1008c, the tubular actuator 1008 moves in +Y direction.

The objective lens 1007 comprises a casing 1007b and a lens 1007a. On the optical axis of the objective lens 1007, a tip (pointed portion) 3 of the cantilever CA is disposed. When a two-dimensional image of the sample SM is to be captured by using the AFM, the cantilever CA is scanned with respect to the stage 1009. For this scanning, a scan voltage is applied to the individual outer electrodes 1008b to 1008e from a scan voltage applying circuit 1014 such that the XY plane is scanned with the tubular actuator 1008 therewithin. Also, the optical microscope including the objective lens 1007 can be used to simultaneously observe the cantilever CA and surface of the sample SM which are being scanned.

Figure 1E:
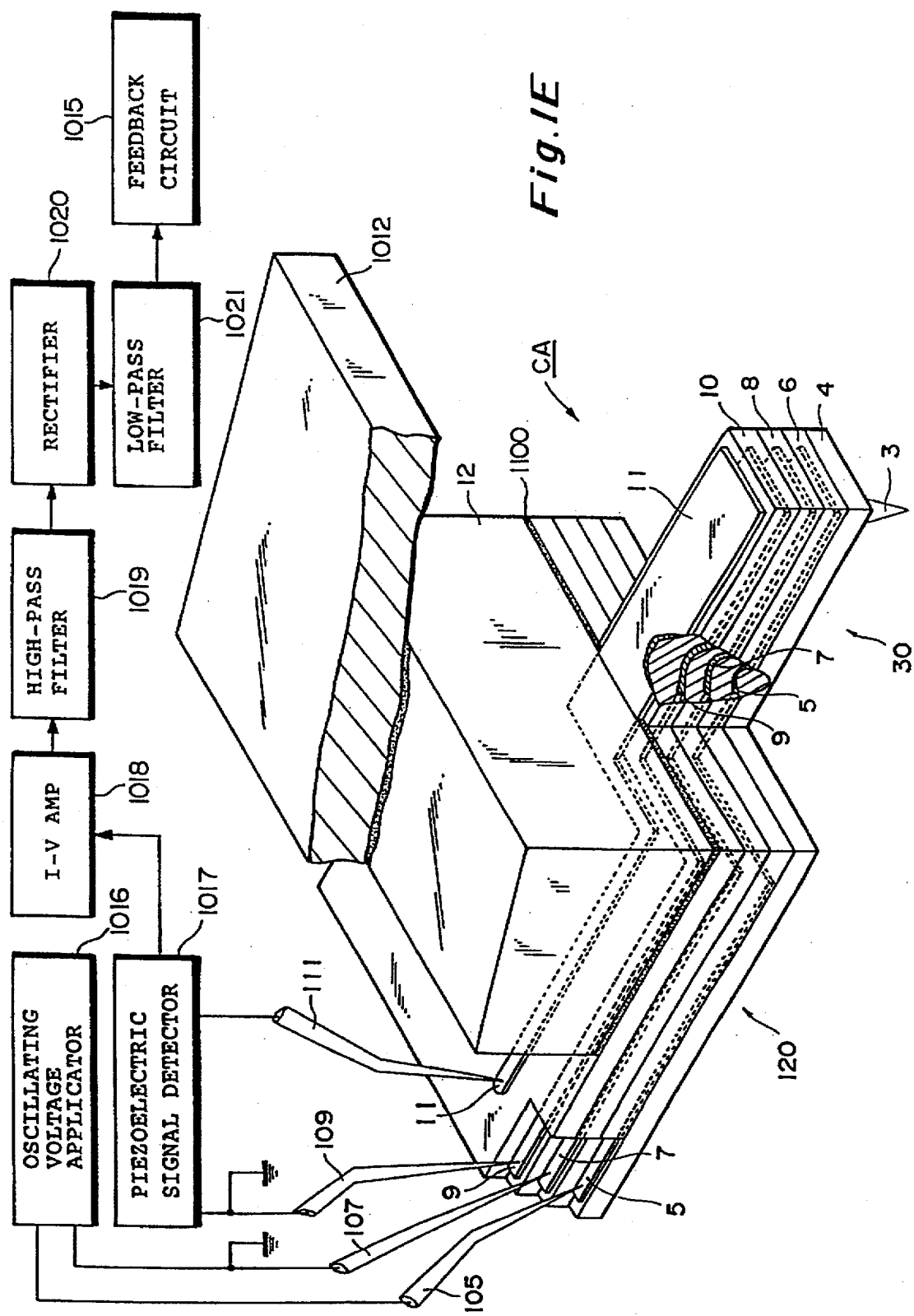
FIG. 1E is an enlarged view of a portion B in FIG. 1B.
Figure 1F:
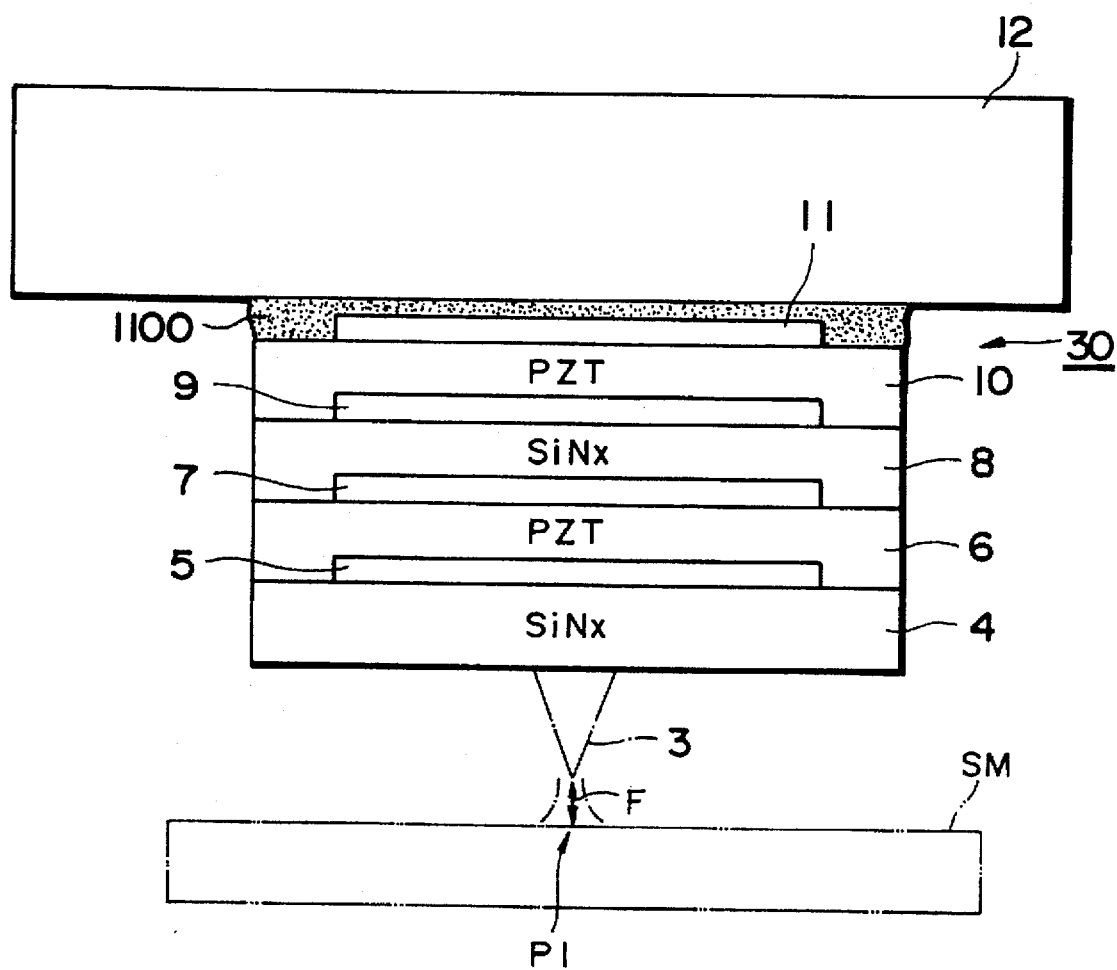
FIG. 1F is a vertical cross-sectional view of the cantilever shown in FIG. 1E.

As such a cantilever, any of the cantilevers explained in the foregoing can be used. For example, FIG. 1E shows an apparatus using the cantilever shown in FIG. 5. Though FIG. 1E is an enlarged view of a portion B of FIG. 1B, other drawings of cantilevers may be used as an enlarged view of this portion. FIG. 1F is a vertical sectional view of the cantilever shown in FIG. 1E.

In the first place, in order to oscillate the cantilever, a driving voltage is applied between electrodes 105 and 107. This voltage is an AC voltage whose frequency coincides with the natural frequency of the cantilever CA. When the frequency of this AC voltage coincides with the natural frequency of the cantilever CA, the latter resonates to oscillate. This AC voltage is generated by an oscillating voltage applicator 1016. When the cantilever is oscillating, interatomic force acts between a tip 3 of the cantilever CA and the sample SM. This interatomic force F is detected as a voltage signal by a piezoelectric signal detector 1017 connected to electrodes 109 and 111. Thus, a piezoelectric crystal 10 deflects due to the interatomic force F between the probe 3 and the surface of the sample SM. When the piezoelectric crystal 10 deflects, a voltage is induced between the electrodes 109 and 111 holding it therebetween. Since thus induced voltage corresponds to the interatomic force F, a voltage which vertically moves the tubular actuator 1008 is applied thereto from a feedback circuit 1015 such that the voltage detected by the piezoelectric signal detector 1017 becomes constant. The voltage applied to the tubular actuator 1008 so as to vertically move it corresponds to the interatomic force F between the sample SM and the probe 3. Accordingly, when the voltage signal output from the feedback circuit 1015 is analyzed by an analyzer 1022, the interatomic force F can be measured. While the voltage for performing the scanning of the cantilever CA is output from the scan voltage applying circuit 1014 as shown in FIG. 1D, the voltage for vertically moving the tubular actuator 1008 is superposed on this scanning voltage.

A current signal output from the piezoelectric signal detector 1017 is converted into a voltage signal and amplified by an I–V amplifier 1018 and then input to the feedback circuit 1015 by way of a high-pass filter 1019, a rectification circuit 1020, and a low-pass filter 1021.

Figure 1G:
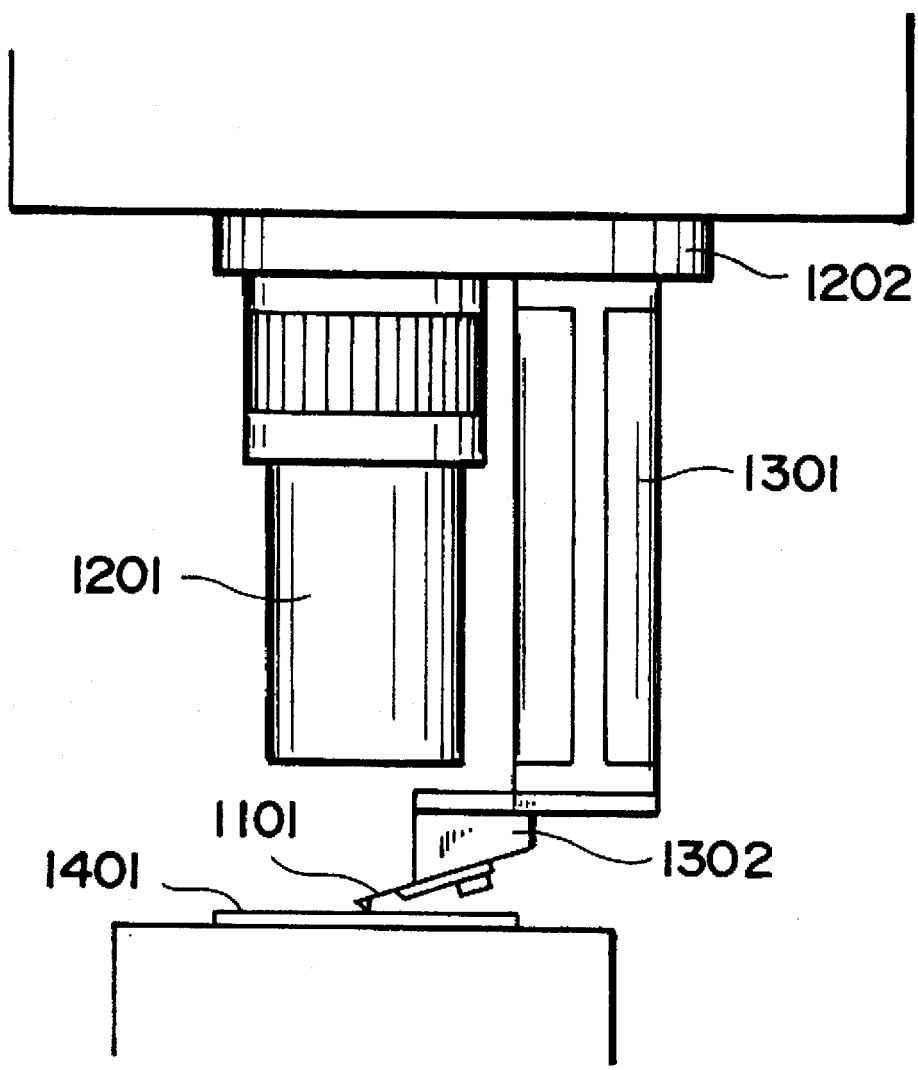
FIG. 1G is a view of a microscope in accordance with another embodiment.

FIG. 1G shows an AFM attached to an optical microscope in accordance with an embodiment of the present invention. To an objective lens 1201 of the optical microscope, a scanning actuator 1301 which can be actuated in three axes is attached in parallel to an attachment 1202 by which the objective lens 1201 is attached to the main body of the optical microscope. At a tip thereof, a tip portion of a piezoelectric film type interatomic force detecting probe 1101 is disposed by way of an attachment 1302 so as to be within an observation visual field of the objective lens. Though not depicted in detail, the attachment 1302 is constructed such that the detecting probe 1101 is movable in three axes.

Figure 1H:
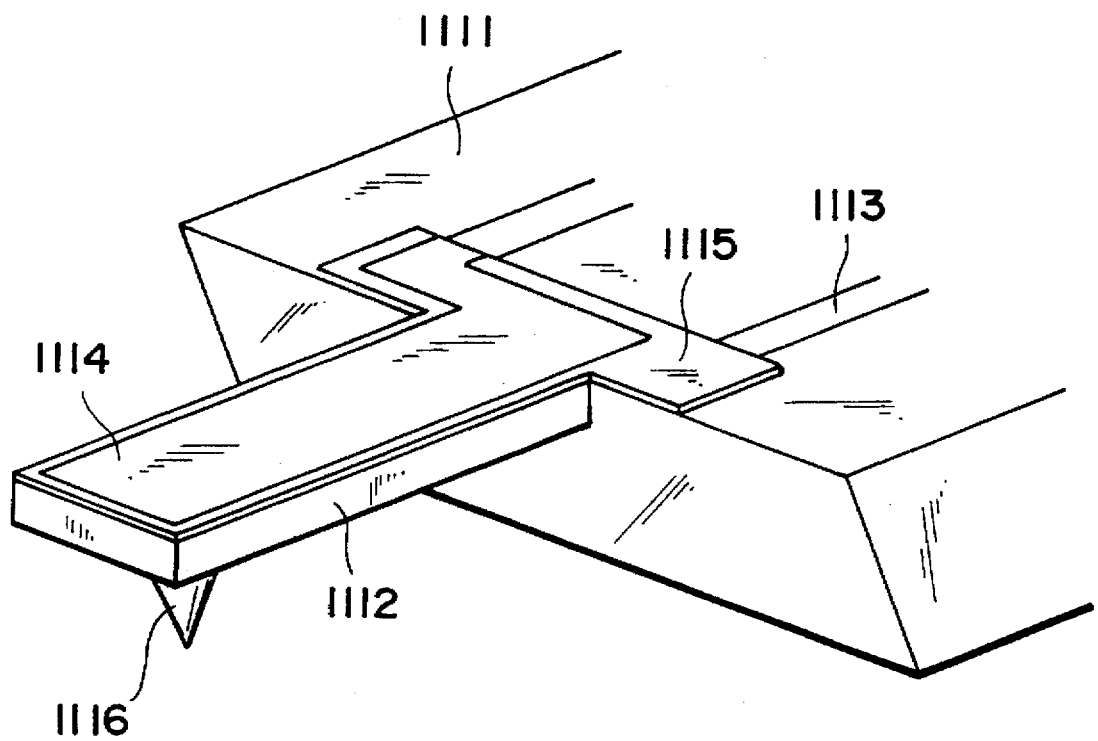
FIG. 1H is a view showing a part of the cantilever shown in FIG. 1G.
Figure 1I:
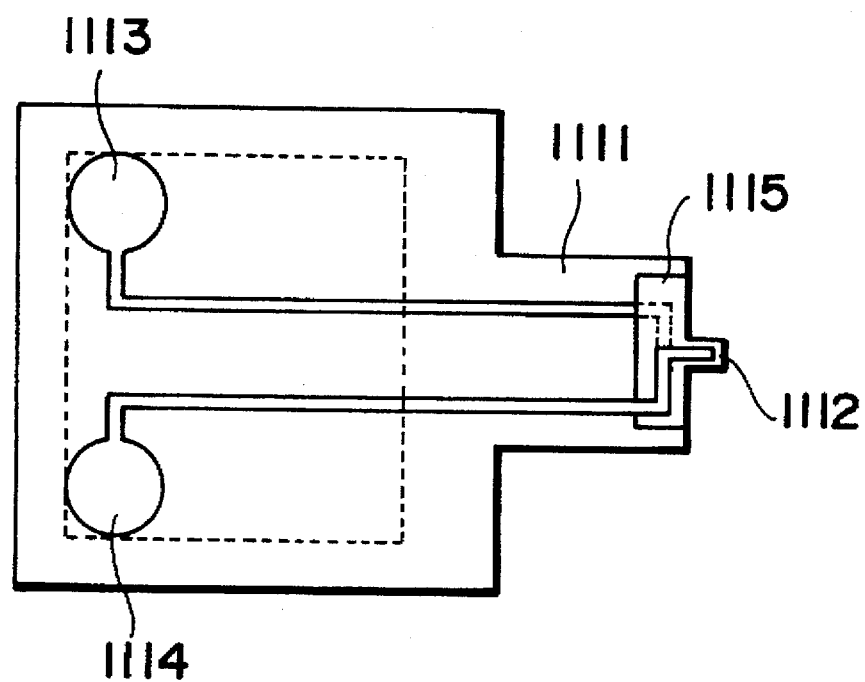
FIG. 1I is a view showing an overall configuration of the cantilever shown in FIG. 1H.
Figure 1J:
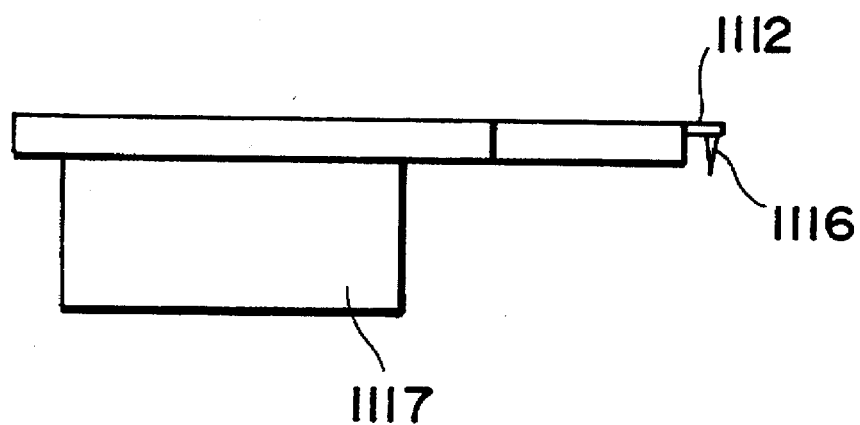
FIG. 1J is a side view of the cantilever shown in FIG. 1I.

Now, with reference to FIGS. 1H, 1I, and 1J, the piezoelectric film type interatomic force detecting probe 1101 will be explained. FIG. 1H is a perspective view showing the tip portion of the piezoelectric film type interatomic force detecting probe 1101. At a tip portion of a silicon wafer 1111, a cantilever 1112 is formed. It is fabricated by etching of the tip portion of the wafer 1111. The cantilever 1112 has a width of 0.2 mm, a length of 0.43 mm, and a thickness of 0.01 mm. At an upper portion of the cantilever 1112, an MgO film, which is not depicted, is formed with a thickness of 200 nm and used as a buffer layer. On this buffer layer, a Pt film is formed with a thickness of 200 nm as a lower electrode 1113. Also, a film of lead zirconate titanate (PZT), which is a ferroelectric in lead family, is formed thereon with a thickness of 1 μm as a piezoelectric layer 1115. Further, a film of Pt is formed thereon with a thickness of 100 nm as an upper electrode 1114. Finally, to a lower portion of the tip of the cantilever 1112, a tungsten needle 1116 is bonded, while a simple harmonic oscillating piezooscillator 1117 is attached to the lower surface thereof. An overall configuration of thus fabricated cantilever is shown in FIGS. 1I and 1J. FIG. 1I is a view from the upper surface, while FIG. 1J is a cross-sectional view. The length of the cantilever to the tip thereof is about 7.5 mm, while the maximum width is 5 mm. In FIG. 1J, the thickness direction is depicted larger than the actual size with respect to the longitudinal direction. As a basic function, when the needle at the tip moves up and down, the piezoelectric layer 1115 is displaced similarly so as to generate a voltage between the electrodes 1113 and 1114 holding the piezoelectric layer 1115 therebetween.

Since the cantilever and the displacement detecting system are unified in this manner, the size of the piezoelectric film type probe can be reduced such that it can be inserted between the objective lens and the sample 1401 to be observed as shown in FIG. 1G. Also, its weight can be reduced to a level where no load is imposed on the ceramic tube type scanning actuator 1301.

While the piezoelectric film type probe 1101 is observed by the optical microscope, the tip portion of the cantilever is moved by X- and Y-direction movable means of the attachment 1302 such that the piezoelectric film type probe 1101 is placed at a portion which is substantially the center of the visual field of the microscope. The sample to be observed and the probe needle at the cantilever tip can be approached to each other by using a fine-adjustment mechanism of the optical microscope stage. It can be observed through the optical microscope. After it is confirmed that the sample and the needle of the probe have come into contact with each other, the scanning actuator 1301 is actuated so as to scan and draw in XYZ directions. Actually, the piezo-oscillator 1117 is oscillated with a predetermined oscillation so as to vibrate the cantilever 1112 and the needle 1116. A voltage is applied to the scanning actuator 1301 in lateral directions (X and Y) so as to scan the cantilever, while the scanning actuator 1301 is used to effect scanning such that the interatomic force received by the needle 1116 of the probe 1101 from the surface form in Z direction becomes constant. The mode of measurement is a so-called tapping mode in which the sample surface and the probe needle periodically come into contact with each other. Since the scanning actuator 1301 is based on the piezo-element, there exists hysteresis between the applied voltage and the actual driving displacement. The relationship between the voltage and the driving displacement may be determined beforehand so as to correct the amount of hysteresis by a computer after the observation of the surface. In addition to the technique in which the stage is ascended, the objective lens and the cantilever system, as a whole, may be descended so as to approach the sample and the cantilever to each other at the time of setting. When other portions of the sample are to be observed, the cantilever and the sample may be once separated from each other and then the stage on which the sample is mounted may be moved by a predetermined distance. The commercially-available factory microscope systems include an encoder by which the distance of movement of the stage can be measured. Such a system can be used to measure a sample having a large size.

Figure 1K:
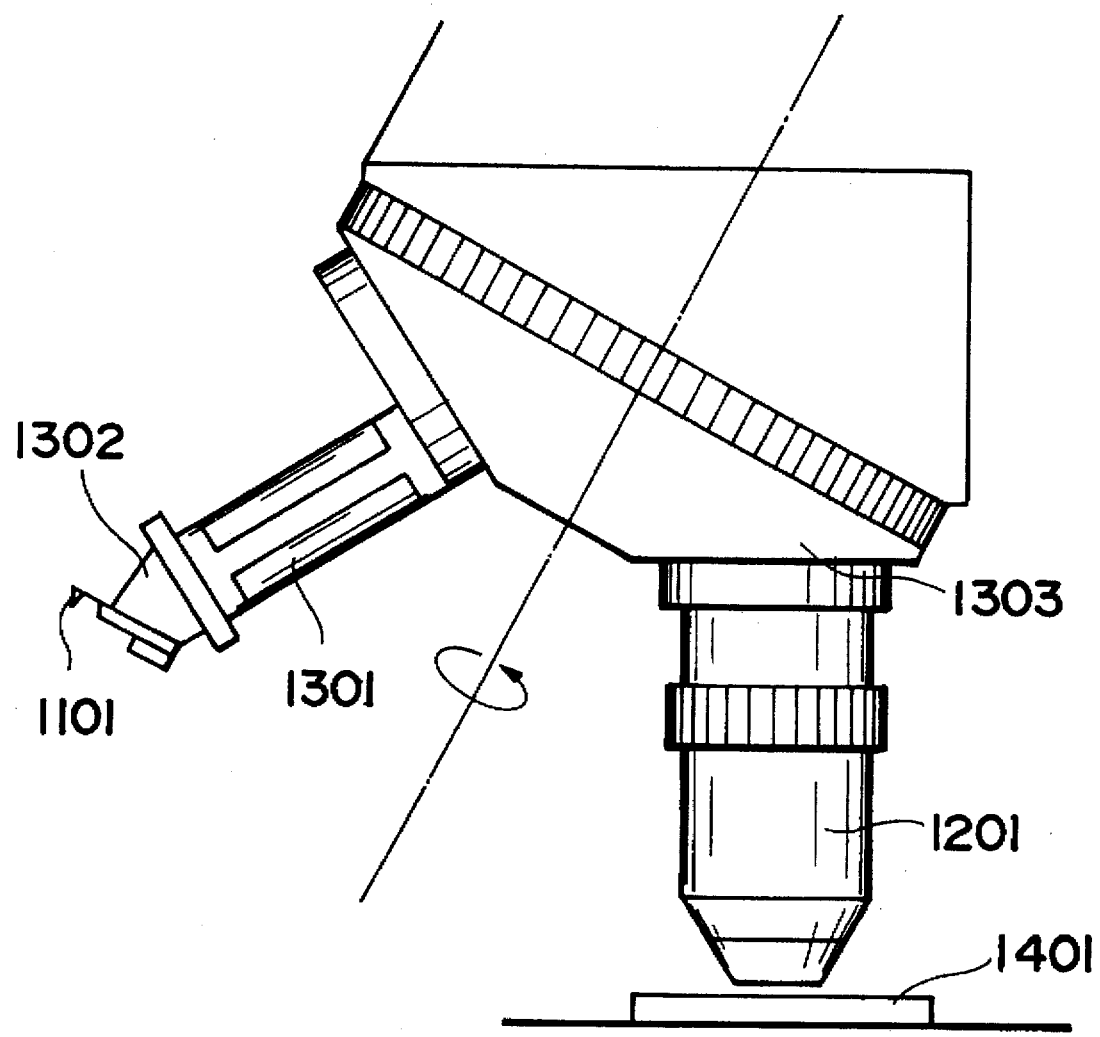
FIG. 1K is a view of a microscope in accordance with another embodiment.

FIG. 1K shows another embodiment. This embodiment applies to a case where a cantilever cannot be inserted into the space between the objective lens of the optical lens and the sample. There is provided a revolver system. As this revolver system is rotated around the depicted axis, the objective lens and a probe 1101 attached to an actuator 1301 can be moved to the same optical axis. The actuator 1301, probe 1101, and attachment 1302 in this embodiment are the same as those of FIG. 1G. Since the cantilever cannot be observed while viewing the optical microscope, it is necessary for the tip of the cantilever to be initially positioned. Namely, the surface of the sample is observed by the optical microscope beforehand so as to determine an approximate position of the area to be observed by the AFM. Then, the revolver is rotated so as to place the cantilever at a predetermined position. Thereafter, the system including the revolver, objective lens, and cantilever, as a whole, may be descended or the stage on which the sample is mounted may be ascended. The subsequent scanning and other operations are the same as those in the embodiment of FIG. 1G.

Figure 1L:
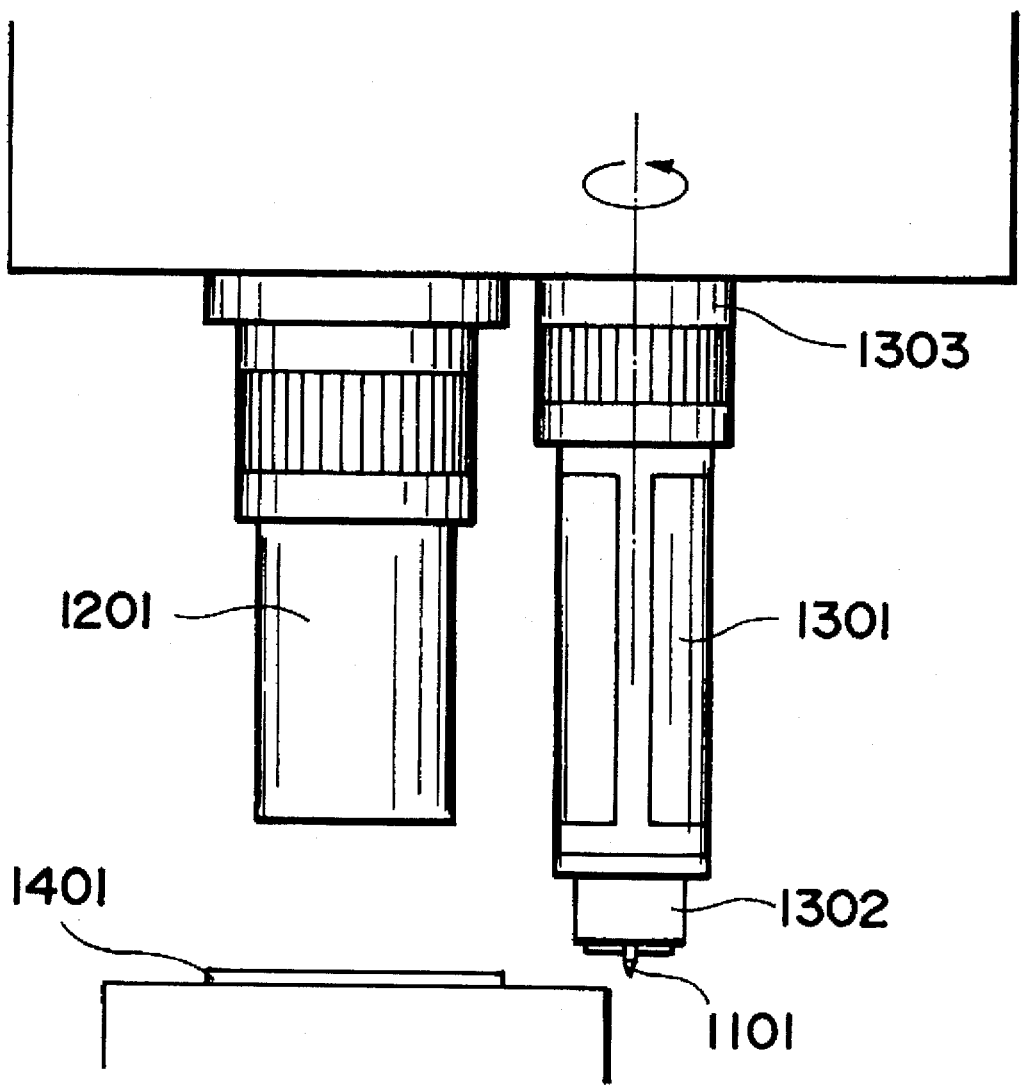
FIG. 1L is a view of a microscope in accordance with another embodiment.

FIG. 1L shows another embodiment. This embodiment is a modification of the embodiment shown in FIG. 1G. A sample 1401 is placed directly below an objective lens 1201 of an optical microscope. Beside the objective lens, a scanning actuator 1301, in which a probe 1101 is attached by way of an attachment 1302, is attached to a member 1303 which is rotatable around the center axis thereof. FIG. 1L shows a configuration in which the longitudinal direction of the cantilever is placed perpendicular to a direction directed to the optical axis of the center of the objective lens. In the embodiment shown in FIG. 1G, since the cantilever is disposed at the center portion of the objective lens, while the approximate position of the cantilever can be observed, it cannot be seen whether there is dust at this portion or not. The present embodiment is to overcome this disadvantage. Namely, the member 1303 is made rotatable around the center axis thereof so as to be clicked at every right angle (while click means are not depicted). After the surface of the sample 1401 is observed by the optical microscope beforehand so as to confirm that there is no dust, the member 1303 is rotated by 90 degrees to the position of the cantilever shown in FIG. 1G so as to effect positioning. Fine positioning is effected by an adjustable mechanism (not depicted) for the attachment 1302 while being observed by the optical microscope. The subsequent operations are the same as those of the embodiment shown in FIG. 1G. After the observation by the AFM with the cantilever, the surface of the sample can be confirmed again by the optical microscope after the probe 1101 is retracted. Accordingly, the existence of abnormal traces and the like can be observed on the spot by scanning of the cantilever. In view of the fact that it has conventionally been difficult for the optical microscope to review and find even the position of the sample displaced after being observed by the AFM, the present embodiment is quite convenient. While the retraction of the cantilever is effected by rotation in this embodiment, it should be noted that the probe 1101, the attachment 1302, the scanning actuator 1301, and the member 1303 may be made movable so as to be separated and retracted from the objective lens. It is preferable that the cantilevers in the foregoing embodiments are essentially used in tapping mode in view of their size. However, when the size of the cantilever is small, it can be observed in non-contact mode.

Though the cantilevers described in the foregoing are made of a piezoelectric film, they are not restricted to this material. For example, the cantilever may have a sensitive film made of a piezoresistor. In this case, a boron-doped silicon film is formed on an oxidized silicon substrate and used as a piezoresistor. Then, the silicon substrate is etched off by back etching to form a cantilever with a piezoresistor. The operations after its attachment and the like are the same as those explained in the foregoing embodiments.

Figure 1M:
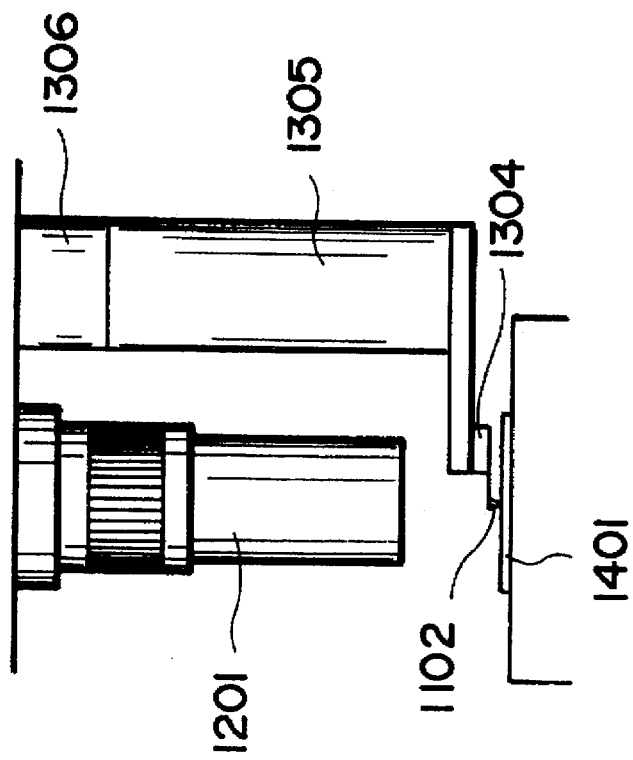
FIG. 1M is a view of a microscope in accordance with another embodiment.
Figure 1N:
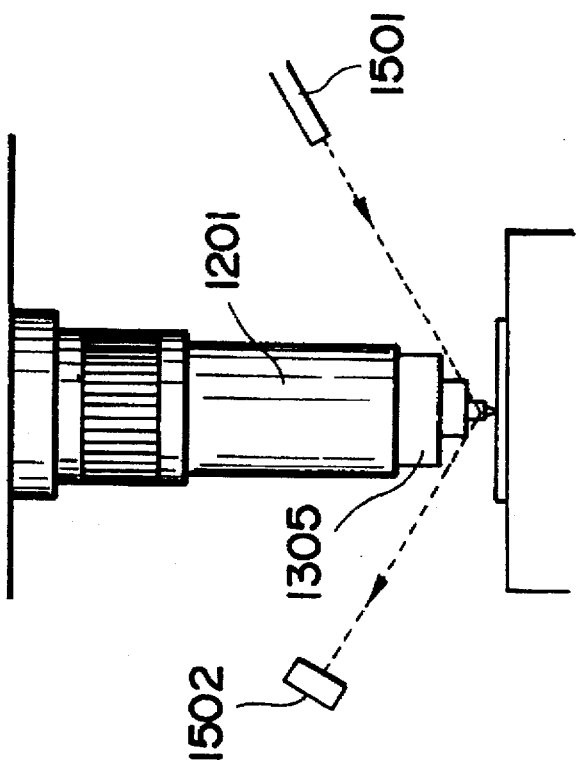
FIG. 1N is a side view of the microscope shown in FIG. 1M.
Figure 1P:
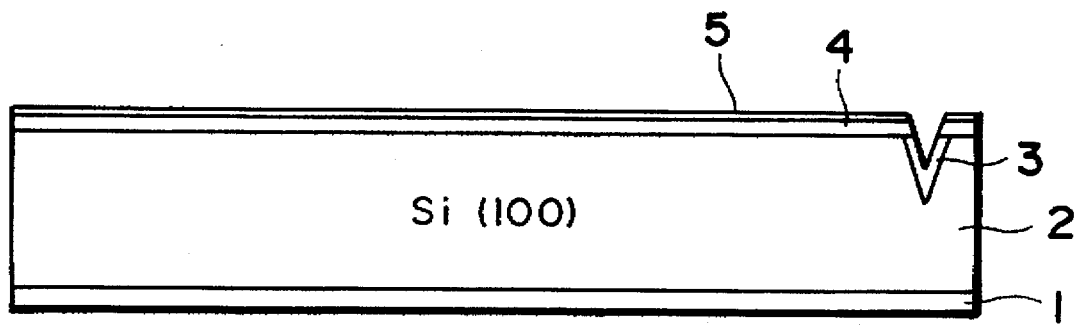
FIG. 1P is a cross section of a cantilever intermediate to illustrate a step for fabricating a cantilever.

Another embodiment of the present invention will be explained in the following. FIGS. 1M and 1N show an embodiment in which the present invention is applied to an optical lever type AFM. FIG. 1M shows a front view of the main portion of this apparatus. Below an objective lens 1201, a sample 1401 to be measured is disposed on a stage. A cantilever 1102 is made of a silicon nitride film and its upper portion has a flatness by which laser light can be reflected. The cantilever 1102 is attached to a holder 1305 by way of an attachment jig 1304. The holder 1305 is attached to an actuator 1306 which is movable in three axes. While an image of the cantilever is observed through the objective lens 1201, the actuator 1306 is operated so as to place the tip of the cantilver at the center portion of the visual field. The cantilever is slowly descended so that the tip of the cantilever comes into contact with the surface of the sample 1401. In the apparatus of FIG. 1M, a helium neon laser impinges on the upper portion of the cantilever from the front side of the paper and the reflected light is taken into a 4-divided sensor. FIG. 1N shows a side view of this configuration. Laser light is brought to a predetermined position by way of an optical fiber 1501 from a light source which is not depicted. The reflected laser light from the upper portion of the cantilever enters a sensor 1502. The positioning of the laser light on the cantilever is performed within the visual field of the optical microscope. While the stage is scanned, the vertical movement of the cantilever is read out from sensor signals. Though a so-called contact mode, in which the vertical movement of the cantilever in response to irregularity of the sample surface is measured, is explained in this embodiment, a piezoelectric element may be attached to the cantilever so as to oscillate the latter such that the embodiment is applied to tapping mode or non-contact mode as in the case of the embodiment shown in FIG. 1G.

FIG. 10 shows an embodiment in which the present invention is applied to an optical interference type AFM. While the basic parts of the objective lens cantilever system are similar to those in the previous embodiment, this embodiment is distinguished therefrom in that the vertical movement of the cantilever is read out by interference of helium neon laser light perpendicularly incident on the cantilever. The laser light is guided through an optical fiber 1501 to a position just in front of the cantilever so as to perpendicularly impinge on the cantilever. The reflected light is taken into the fiber again and then the movement of the cantilever is observed by an interference system which is not depicted. As in the case of the previous embodiment, this embodiment can also be applied to a technique in which the cantilever is oscillated by a piezoelectric element.

Without being restricted to the foregoing embodiments, the present invention can be applied to other examples in which a very small cantilever is used, for example, to a magnetic force microscope and the like.

As explained in the foregoing, in accordance with the present invention, an image of a low to medium magnification is observed by the optical microscope and then the same sample is observed by the attached AFM to confirm its scanning position, thereby enabling a high-resolution image to be obtained.

Also, before and after the observation by the AFM, the surface of the sample to be measured and the cantilever itself can be observed by the optical microscope on the spot so as to study conditions of the sample surface and cantilever. Further, the optical microscope can be used during the positioning of the cantilever, the positioning of the laser light on the cantilever, and the like. Moreover, a large sample can be observed thereby.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An atomic force microscope, comprising:
   a tubular piezoelectric actuator which can deform along the axial direction thereof;
   an objective lens arranged in said tubular piezoelectric actuator; and
   a cantilever attached to said tubular piezoelectric actuator, said cantilever being deflectable, said cantilever having a pointed portion arranged under said objective lens, said cantilever being comprised of piezoelectric material, wherein said cantilever comprises:
   a silicon layer;
   a piezoelectric crystal layer;
   a first electrode located between said piezoelectric crystal layer and said silicon layer, having a first layer comprised of titanium, and a second layer comprised of platinum, and
   a second electrode formed on said piezoelectric crystal layer.

2. An atomic force microscope according to claim 1, further comprising:

a detector for detecting a signal generated by deflection of said cantilever, a feedback circuit for applying a voltage to said tubular piezoelectric actuator such that said signal detected by said detector is constant.

3. An atomic force microscope according to claim 1, further comprising:

a circuit to apply a scan voltage to said tubular piezoelectric actuator causing said cantilever to scan.

4. An atomic force microscope, comprising:

a tubular piezoelectric actuator which can deform along the axial direction thereof;

an objective lens arranged in said tubular piezoelectric actuator; and a cantilever attached to said tubular piezoelectric actuator, said cantilever being deflectable, said cantilever having a pointed portion arranged under said objective lens, said cantilever being comprised of piezoelectric material, wherein said cantilever comprises:

a first layer comprised of piezoelectric crystal, said first layer being comprised of material containing lead;

an insulator layer;

an electrode disposed between said first layer and said insulator layer; and a buffer layer disposed between said insulator layer and said first layer.

5. An atomic force microscope according to claim 4, further comprising:

a detector for detecting a signal generated by deflection of said cantilever, a feedback circuit for applying a voltage to said tubular piezoelectric actuator such that said signal detected by said detector is constant.

6. An atomic force microscope according to claim 4, further comprising:

a circuit to apply a scan voltage to said tubular piezoelectric actuator causing said cantilever to scan.

* * * * *